(12) United States Patent
Sriram et al.

(10) Patent No.: US 8,990,280 B2
(45) Date of Patent: Mar. 24, 2015

(54) CONFIGURABLE SYSTEM FOR PERFORMING REPETITIVE ACTIONS

(75) Inventors: Partha Sriram, Los Altos, CA (US); Robert Quan, San Francisco, CA (US); Bhagawan Reddy Gnanapa, Andrha Pradesh (IN); Ahmet Karakas, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 1501 days.

(21) Appl. No.: 11/599,106

(22) Filed: Nov. 14, 2006

(65) Prior Publication Data

US 2007/0078661 A1    Apr. 5, 2007

Related U.S. Application Data

(63) Continuation of application No. 11/243,292, filed on Sep. 30, 2005, now Pat. No. 7,433,981.

(51) Int. Cl.

| G06F 17/14 | (2006.01) |
| G06F 7/52 | (2006.01) |
| G10L 19/02 | (2013.01) |
| G10L 25/27 | (2013.01) |

(52) U.S. Cl.
CPC .......... *G06F 17/147* (2013.01); *G10L 19/0212* (2013.01); *G10L 25/27* (2013.01)
USPC ............................ 708/400; 708/402; 708/607

(58) Field of Classification Search
CPC .................................................... G06F 17/147
USPC .......................... 708/400–409, 200, 233, 607
See application file for complete search history.

(56) References Cited

U.S. PATENT DOCUMENTS

| 4,366,548 | A | * | 12/1982 | Kregness et al. | 708/505 |
| 4,876,660 | A | * | 10/1989 | Owen et al. | 708/603 |
| 5,029,069 | A | * | 7/1991 | Sakamura | 708/525 |
| 5,544,336 | A | | 8/1996 | Kato et al. | |
| 5,794,181 | A | * | 8/1998 | Benbassat et al. | 708/628 |
| 5,796,844 | A | * | 8/1998 | Griesinger | 381/18 |
| 5,890,106 | A | | 3/1999 | Bosi-Goldberg | 704/203 |
| 5,931,892 | A | * | 8/1999 | Thome et al. | 708/322 |
| 6,351,730 | B2 | * | 2/2002 | Chen | 704/229 |
| 6,530,010 | B1 | * | 3/2003 | Hung et al. | 708/523 |

(Continued)

OTHER PUBLICATIONS

Notice of Allowance Date Mailed Oct. 12, 2007; U.S. Appl. No. 11/243,292.

(Continued)

*Primary Examiner* — Chuong D Ngo

(57) ABSTRACT

In some embodiments, a data processing system including an operation unit including circuitry configurable to perform any selected one of a number of operations on data (e.g., audio data) and a configuration unit configured to assert configuration information to configure the operation unit to perform the selected operation. When the operation includes matrix multiplication of a data vector and a matrix whose coefficients exhibit symmetry, the configuration information preferably includes bits that determine signs of all but magnitudes of only a subset of the coefficients. When the operation includes successive addition and subtraction operations on operand pairs, the configuration information preferably includes bits that configure the operation unit to operate in an alternating addition/subtraction mode to perform successive addition and subtraction operations on each pair of data values of a sequence of data value pairs.

18 Claims, 9 Drawing Sheets

(56) References Cited

U.S. PATENT DOCUMENTS

| | | |
|---|---|---|
| 6,657,746 B1 | 12/2003 | Fuchigami et al. |
| 7,433,981 B1 | 10/2008 | Quan et al. |
| 7,640,285 B1 * | 12/2009 | Oberman et al. ............. 708/523 |
| 2002/0065790 A1 | 5/2002 | Oouchi |
| 2002/0065860 A1 * | 5/2002 | Grisenthwaite et al. ...... 708/207 |
| 2002/0173967 A1 * | 11/2002 | Law et al. .................... 704/500 |
| 2003/0035157 A1 | 2/2003 | Kanai |
| 2005/0216239 A1 | 9/2005 | Furuya et al. |

OTHER PUBLICATIONS

Notice of Allowance Date Mailed Nov. 29, 2007; U.S. Appl. No. 11/243,292.

* cited by examiner

CONFIGURABLE SYSTEM FOR PERFORMING REPETITIVE ACTIONS

CROSS-REFERENCE TO RELATED APPLICATION

The present application is a continuation in part of U.S. patent application Ser. No. 11/243,292, now U.S. Pat. No. 7,433,981, entitled "System and Method for Using Co-Processor Hardware to Accelerate Highly Repetitive Actions," filed on Sep. 30, 2005, now U.S. Pat. No. 7,433,981.

FIELD OF THE INVENTION

The invention pertains to methods and configurable circuitry for performing repetitive actions on data (e.g., audio data), and methods and systems for configuring such circuitry to perform such actions. Examples of the repetitive actions are steps of an MDCT (or inverse MDCT) implemented by pre-modulating data, performing an intermediate transform (e.g., discrete Fourier transform (DFT), discrete cosine transform (DCT), inverse DCT, or inverse DFT) on the pre-modulated data, and post-modulating the data generated during the intermediate transform.

BACKGROUND OF THE INVENTION

Throughout this disclosure (including in the claims), "DFT" denotes a discrete Fourier transform, "FFT" denotes a Fast Fourier Transform (which is a specific type of DFT), "IFFT" denotes an inverse Fast Fourier Transform, "MDCT" denotes the well-known modified discrete cosine transform, and "IDCT" denotes the well-known inverse DCT (inverse modified discrete cosine transform).

Throughout this disclosure (including in the claims) the expression "T/F transform" denotes a time-domain to frequency-domain transform in which time-domain data (e.g., time-domain audio data) are converted to frequency-domain data. Examples of T/F transforms include a DFT and an MDCT.

Throughout this disclosure (including in the claims) the expression "F/T transform" denotes a frequency-domain to time-domain transform (e.g., an inverse T/F transform) in which frequency-domain data (e.g., frequency-domain audio data) are converted to time-domain data. Examples of F/T transforms include an inverse DFT, an inverse MDCT, and an IDCT.

Throughout this disclosure (including in the claims) the expressions "repetitive tasks" and "repetitive actions" denote steps (of data processing operations) that perform the same mathematical operation (or sequence of operations) on each set of operands in a sequence of operand sets. The term "repetitive" is used as a synonym for "iterative." Examples of repetitive tasks include matrix multiplication and scaling. Repetitive tasks are required in many filtering, scaling, and F/T and T/F transforms, and are often performed on large blocks of data (e.g., audio data).

Throughout this disclosure (including in the claims) the term "comprises" denotes "is" or "includes," and the expression "in a manner equivalent to" denotes either "by" or "in a manner not identical to but equivalent to."

In recent years consumer electronic devices employing audio compression have achieved tremendous commercial success. The most popular category of these devices includes the so-called MP3 players and portable media players. Such a player can store user-selected songs in compressed format on a storage medium present in the player, and includes electronic circuitry that decodes and decompresses the compressed songs in real time. Several audio compression formats (e.g., MPEG1-Layers I, II, III, MPEG2-AAC, Windows Media Audio or "WMA," and Dolby AC3) are in use.

Most conventional audio compression algorithms use a perceptual transform coding paradigm. In perceptual transform coding, a time-domain audio signal is converted to frequency-domain using a T/F transform during encoding. During decoding the reconstructed frequency-domain coefficients are converted to time-domain reconstructed audio samples using an inverse T/F transform.

The T/F transform most commonly used for audio data processing is the Modified Discrete Cosine Transform (MDCT) also referred to as Time-Domain Alias Cancellation (TDAC) filter-bank. For example, Dolby AC3, MPEG2-AAC, and WMA all use MDCT.

The inverse MDCT equations for conversion from frequency-domain coefficients X(k) to time-domain samples x(n), which are typically audio data samples, are:

$$x(n) = c \cdot \sum_{k=0}^{N/2-1} X(k) \cdot \cos\left(\frac{2\pi}{N} \cdot (n+n_0) \cdot (k+1/2)\right), \quad (1)$$

for $n = 0, 1, \ldots, N-1$.

In case of an inverse MDCT performed to implement MPEG2-AAC decoding, the phase factor $n_0$ in equation (1) satisfies $n_0=(N/2+1)/2$, and the scaling constant c is c=2/N.

It is well known (for example, as described in U.S. Pat. No. 5,890,106) that:

an MDCT can be implemented as three operations on the input time-domain values: pre-modulation followed by a DFT (e.g., an FFT) or DCT (direct cosine transform) to generate transformed data, and finally post-modulation of the transformed data, and an inverse MDCT can be implemented as three operations on input frequency-domain coefficients X(k): pre-modulation followed by a inverse DFT (e.g., an inverse FFT or "IFFT") or inverse DCT to generate inverse-transformed data, and finally post-modulation of the inverse-transformed data.

In this disclosure (including in the claims), the expression "intermediate transform" is used to denote the DFT or DCT performed between the pre-modulation and post-modulation phases of an MDCT, or the inverse DFT or inverse DCT performed between the pre-modulation and post-modulation phases of an inverse MDCT.

Thus, it is well known to implement an inverse MDCT by determining time-domain values g(n) in response to frequency coefficients X(k) as follows:

$$g(n)=\text{post-modulation}(IFFT(\text{pre-modulation}(G(k))), \quad (2)$$

where $Re(G(k))=-X(2k)$ and $Im(G(k))=X(N/2-2k-1)$ for $k=0, \ldots, N/4$.

The time-domain signal is then derived from Re(g(n)) and Im(g(n)) of equation (2) by index reassignment and sign modifications. The derivation of the decomposition of an inverse MDCT into pre-modulation, inverse FFT, and post-modulation operations and relation between x(n) and g(n) is well known and available in literature.

Since the introduction of the first portable audio players in the market in 1997, MPEG1-Layer III (or "MP3") audio format has become the de-facto standard for portable media players. The format has been so successful that the term MP3 is sometimes used as a synonym for compressed audio and the expression MP3 player is sometimes used to denote any portable audio player.

In perceptual transform coding, time-domain samples of input audio are first converted into frequency-domain coefficients using an analysis filterbank. The frequency-domain coefficients at the output of analysis filterbank are then quantized using perceptual criteria in order to achieve the highest audio quality at the desired bit rate. At the decoder, the frequency-domain coefficients are reconstructed through the process of inverse quantization of the quantized coefficients. The reconstructed frequency-domain coefficients are then transformed back to time-domain audio samples using a synthesis filterbank.

MPEG1-Layers I, II, and III all use a pseudo perfect-reconstruction quadrature mirror filterbank (QMF) to implement a T/F transform during encoding. Such an analysis filterbank decomposes the time-domain signal to be encoded into 32 streams of frequency coefficients (also referred to as 32 "frequency band signals" or 32 streams of "frequency-band coefficients"), each corresponding to a different one of 32 different frequency bands. The MPEG1-Layer III ("MP3") encoding method further decomposes each of such 32 frequency sub-band signals into 18 streams of frequency-domain coefficients (which are also "frequency band signals," each corresponding to a different one of 18 different frequency sub-bands of one of the 32 frequency bands, and are sometimes referred to herein as "frequency sub-band signals" or streams of "frequency sub-band coefficients") using a modified discrete cosine transform. Thus a 576-band analysis filterbank can be used to convert time-domain samples of input audio into 576 streams of frequency sub-band coefficients (which are then quantized) to implement MP3 encoding.

Another conventional audio compression format is Sub Band Coding ("SBC"). The SBC algorithm also uses a pseudo perfect-reconstruction QMF to implement a T/F transform during SBC encoding. Such an analysis filterbank decomposes the time-domain signal to be encoded into 4 or 8 frequency bands. Thus, a four-band (or eight-band) analysis filterbank can be used to convert time-domain samples of input audio into 4 (or 8) streams of frequency-domain coefficients (which then undergo quantization) to implement SBC encoding.

During conventional encoding (e.g., MP3 or SBC encoding) of audio data of the types discussed above, it is known to implement an analysis filterbank as a first stage configured to perform anti-aliasing (or low-pass) filtering followed by a second stage configured to perform a time-domain to frequency-domain transform (e.g., an MDCT, during MP3 encoding). A cascade of such a first stage and such a second stage is equivalent to (and can implement) a filter stage (that implements any of a broad class of filtering operations) followed by a decimation (down-sampling) stage.

During conventional decoding (e.g., MP3 or SBC decoding) of audio data of the types discussed above, it is known to implement a synthesis filterbank as a first stage configured to perform a frequency-domain to time-domain transform (e.g., an inverse MDCT) followed by a multi-input multi-output low-pass filtering operation. A cascade of such a first stage and such a second stage is equivalent to (and is derived from) an up-sampling stage followed by a filter stage (that implements a bank of parallel band-pass filters that are cosine-modulated versions of a low-pass prototype filter).

Most digital signal-processing algorithms consist of repetitive tasks that are large in scope, and typically produce large dimensional arrays (memory blocks) as outputs in response to large dimensional arrays (memory blocks) as inputs. Conventional digital signal processors typically implement these tasks using a hardware and/or software loop. The loop or nested-loops consist of many instructions. Although this approach provides programmability it is not the most efficient in terms of power consumption, clock cycles or die size.

Above-cited U.S. patent application Ser. No. 11/243,292 discloses systems and methods for performing repetitive tasks (e.g., matrix multiplications and other operations) with improved power and computational efficiency, using a co-processor hardware accelerator that requires small configuration overhead and achieves low-power and high efficiency. However, U.S. application Ser. No. 11/243,292 does not explain how to configure and operate a configurable co-processor to perform an MDCT or inverse MDCT on data (e.g., by pre-modulating the data, performing an intermediate transform on the pre-modulated data, and post-modulating the data generated during the intermediate transform, or in any other way). Nor does it teach how to configure and operate a configurable co-processor to perform efficient matrix multiplication (in which only a subset of the coefficients of a matrix to be multiplied are read from external memory) or efficient alternating addition/subtraction of pairs of operands, or how to configure and operate a configurable co-processor to operate in efficient addressing modes for reading input values (to be operated on by the configured co-processor) from memory or writing output values generated during post-configuration operation of a configured co-processor to memory. It would be desirable to configure and operate a configurable co-processor to perform an MDCT or inverse MDCT on data by pre-modulating the data, performing an intermediate transform on the pre-modulated data, and post-modulating the data generated during the intermediate transform, with high computational efficiency and in a manner consuming low power, and to configure and operate a configurable co-processor efficiently to perform matrix multiplication and/or alternating addition/subtraction on pairs of operands, and/or to implement efficient addressing modes during post-configuration operation.

SUMMARY OF THE INVENTION

In a first class of embodiments, the inventive system is an audio data processing system including:

an operation unit including circuitry configurable to perform any selected one of a number of operations on audio data, including at least one operation that includes a matrix multiplication of a data vector and a matrix comprising coefficients that have symmetry; and a configuration unit coupled and configured to assert configuration information to the operation unit to configure the operation unit to perform the selected one of the operations, wherein the configuration unit is operable to assert configuration bits to the operation unit to configure the operation unit to perform the matrix multiplication, wherein the configuration bits determine signs of all of the coefficients but magnitudes of only a subset of the coefficients.

In some embodiments in the first class (and in the fourth class described below), the configuration bits are indicative of the magnitudes of the subset of the matrix coefficients. In other embodiments, the magnitudes of the subset of the matrix coefficients are stored in a memory and the configuration bits determine addresses of the magnitudes in the memory. In some of the latter embodiments, the operation unit includes a DMA engine operable to read the magnitudes of the subset of coefficients from locations of the memory having said addresses.

In some embodiments in the first class (and in the fourth class described below), the matrix consists of four coefficients, the subset consists of two of the coefficients, and the configuration bits include a configuration bit-field (e.g., a two-bit or four-bit configuration bit-field) that specifies the signs of all four coefficients of the matrix. In some embodiments in either class, the matrix consists of four coefficients, the subset consists of two of the coefficients, two of the coefficients of the matrix have a first magnitude (and either the same sign or opposite signs) and the other two coefficients of the matrix have a second magnitude (and either the same sign or opposite signs).

In a second class of embodiments, the inventive system is an audio data processing system including:

an operation unit including circuitry configurable to perform any selected one of a number of operations on audio data, including at least one operation in which the operation unit performs successive addition and subtraction operations on each pair of operands of a sequence of operand pairs; and a configuration unit coupled and configured to assert configuration information to the operation unit to configure said operation unit to perform the selected one of the operations, wherein the configuration unit is operable to assert to the operation unit configuration bits which configure the operation unit to access a sequence of pairs of data values and operate in an alternating addition/subtraction mode to perform successive addition and subtraction operations on each pair of data values of the sequence of pairs of data values.

In some embodiments in the second class (and in the fifth class described below), at least some of the data values in the sequence of pairs of data values are stored in a memory and the configuration bits determine addresses of the data values that are stored in the memory. In some such embodiments, the operation unit includes a DMA engine operable to read the data values from locations of the memory determined by these addresses.

In a third class of embodiments, the inventive system is an audio data processing system including:

an operation unit including circuitry configurable to perform any selected one of a number of operations on audio data, including at least one operation that includes repetitive tasks, wherein the circuitry is configured to access a memory to read data from the memory and write data to the memory; and a configuration unit coupled and configured to assert configuration information to the operation unit to configure said operation unit to perform the selected one of the operations, wherein the configuration unit is operable to assert configuration bits to the operation unit to configure the operation unit to operate in a non-consecutive addressing mode to access memory locations of the memory having consecutive addresses in a predetermined non-consecutive sequence. Post-configuration operation in such a non-consecutive addressing mode can achieve significant savings in processing clock cycles and power consumption in accordance with the invention.

In some embodiments in the third class (and in the sixth class described below), the non-consecutive addressing mode is a butterfly addressing mode in which the operation unit accesses N elements of a data vector $X(k)$, where $0 \leq k \leq N-1$, stored in memory locations in the memory having consecutive addresses, from a sequence of the memory locations having a predetermined non-consecutive sequence of addresses wherein the data vector is $X(k)$, where $0 \leq k \leq N-1$. N can be any integer greater than one. In one class of examples in which N is an even number greater than six, the operation unit in the butterfly addressing mode can read the elements of the data vector in the sequence $X(0)$, $X(N-1)$, $X(1)$, $X(N-2)$, ..., $X(N/2-2)$, $X(N-(N/2-1))$, $X(N/2-1)$, and $X(N-N/2)$, and then $X(N-N/2)$, $X(N/2-1)$, $X(N-(N/2-1))$, $X(N/2-2)$, ..., $X(N-2)$, $X(1)$, $X(N-1)$, and $X(0)$. In another example, N=4 and the operation unit in the butterfly addressing mode can read the elements of the data vector in the sequence $X(0)$, $X(3)$, $X(1)$, and then $X(2)$. In another example, the data vector $X(k)$ consists of N complex elements, each complex element having a real part $Re(X(k))$ and an imaginary part $Im(X(k))$ stored in memory locations having consecutive addresses, and the operating unit in the butterfly addressing mode can execute memory accesses to access first all the real parts of the data vector's elements (in consecutive order) and then all the imaginary parts of the data vector's elements (also in consecutive order).

In some embodiments in the third class (and in the sixth class described below), the non-consecutive addressing mode is a bit-reversed addressing mode in which the operation unit accesses N elements of a data vector ($X(k)$, where $0 \leq k \leq N-1$) stored in memory locations in the memory having consecutive addresses in a predetermined non-consecutive sequence. In some such embodiments, the data vector $X(k)$ consists of N=8 complex elements, each complex element having a real part $Re(X(k))$ and an imaginary part $Im(X(k))$ stored in memory locations having consecutive addresses, and the operating unit executes memory accesses in the bit-reversed addressing mode to access the elements of the data vector in the sequence $Re(X(0))$, $Im(X(0))$, $Re(X(4))$, $Im(X(4))$, $Re(X(2))$, $Im(X(2))$, $Re(X(6))$, $Im(X(6))$, $Re(X(1))$, $Im(X(1))$, $Re(X(5))$, $Im(X(5))$, $Re(X(3))$, $Im(X(3))$, and $Re(X(7))$, $Im(X(7))$; or in the sequence $Re(X(0))$, $Re(X(4))$, $Re(X(2))$, $Re(X(6))$, $Re(X(1))$, $Re(X(5))$, $Re(X(3))$, $Re(X(7))$, $Im(X(0))$, $Im(X(4))$, $Im(X(2))$, $Im(X(6))$, $Im(X(1))$, $Im(X(5))$, $Im(X(3))$, and $Im(X(7))$.

Preferably, operation unit of the third (or sixth) class of embodiments includes configurable address generation circuitry, and the configuration bits configure the configurable address generation circuitry simply by specifying a vector size and a non-consecutive addressing mode in which the operating unit should operate (to read from memory elements of a vector having the specified size, or write to memory elements of a vector having the specified size). The configurable address generation circuitry preferably includes address offset circuitry operable in each non-consecutive addressing mode to assert a predetermined sequence of offset values (unique to that addressing mode) that determines a sequence of translated addresses in response to each base address of a data vector of the specified size to be read from or written to memory. For example, the address offset circuitry can include registers that contain, or include logic for generating, a predetermined sequence of offset values for each of a number of different vector sizes in each different addressing mode. During post-configuration operation of the operating unit, the elements of each predetermined sequence of offset values can be added sequentially to the base address of a data vector to generate a sequence of translated addresses for the elements of the data vector. These translated addresses can then be asserted to a DMA engine to cause the DMA engine to read elements of the vector from (or write elements of the vector to) the memory locations determined by the translated addresses. Configuration bits from the system's configuration unit are asserted to the address offset circuitry during a configuration phase to determine the particular predetermined sequence of offset values to be asserted by the address offset circuitry during post-configuration operation (by specifying an addressing mode and vector size).

In a fourth class of embodiments, the inventive system is a data processing system including:

an operation unit including circuitry configurable to perform any selected one of a number of operations on data, including at least one of a T/F transform and an F/T transform on the data that includes a matrix multiplication of a data vector and a matrix comprising coefficients that have symmetry; and a configuration unit coupled and configured to assert configuration information to the operation unit to configure the operation unit to perform the selected one of the operations, wherein the configuration unit is operable to assert configuration bits to the operation unit to configure the operation unit to perform the matrix multiplication, wherein the configuration bits determine signs of all of the coefficients but magnitudes of only a subset of the coefficients.

In a fifth class of embodiments, the inventive system is a data processing system including:

an operation unit including circuitry configurable to perform any selected one of a number of operations on data, including at least one of a T/F transform and an F/T transform on the data in which the operation unit performs successive addition and subtraction operations on each pair of operands of a sequence of operand pairs; and a configuration unit coupled and configured to assert configuration information to the operation unit to configure said operation unit to perform the selected one of the operations, wherein the configuration unit is operable to assert to the operation unit configuration bits which configure the operation unit to access a sequence of pairs of data values and operate in an alternating addition/subtraction mode to perform successive addition and subtraction operations on each pair of data values of the sequence of pairs of data values.

In a sixth class of embodiments, the inventive system is a data processing system including:

an operation unit including circuitry configurable to perform any selected one of a number of operations on data, including at least one of a T/F transform and an F/T transform on the data that includes repetitive tasks, wherein the circuitry is configured to access a memory to read data from the memory and write data to the memory; and a configuration unit coupled and configured to assert configuration information to the operation unit to configure said operation unit to perform the selected one of the operations, wherein the configuration unit is operable to assert configuration bits to the operation unit to configure the operation unit to operate in a non-consecutive addressing mode to access memory locations in the memory having consecutive addresses in a predetermined non-consecutive sequence. Post-configuration operation in such a non-consecutive addressing mode can achieve significant savings in processing clock cycles and power consumption in accordance with the invention.

In preferred implementations of any embodiment of the inventive system, the operation unit includes circuitry configurable to perform any selected one of a number of operations on data, including an MDCT. Preferably, the MDCT includes the steps of pre-modulating a first set of data values to generate pre-modulated data, performing an intermediate transform (e.g., an FFT) on the pre-modulated data to generate transformed data, and post-modulating the transformed data. In other preferred implementations of any embodiment of the inventive system, the operation unit includes circuitry configurable to perform any selected one of a number of operations on data, including an inverse MDCT. Preferably, the inverse MDCT includes the steps of pre-modulating a first set of data values to generate pre-modulated data, performing an intermediate transform (e.g., an IFFT) on the pre-modulated data to generate transformed data, and post-modulating the transformed data.

In preferred implementations of any embodiment of the inventive system, the operation unit includes circuitry configurable to perform any selected one of the operations on audio data, and the inventive system is an audio data processing system (e.g., a subsystem of a portable media player, or of another portable data processing system, or of a data processing system not intended to be portable), and/or the configuration unit includes registers for storing a configuration list (a sequence of configuration commands and configuration data) and the configuration unit is operable to assert to the operation unit configuration bits determined by the configuration list.

In preferred implementations of any embodiment of the inventive system, the operation unit has a configurable hardware-accelerator micro-architecture (e.g., a configurable hardware-accelerator micro-architecture that facilitates efficient and low-power performance of both a forward MDCT and an inverse MDCT).

In preferred implementations, the operation unit of the inventive system comprises circuitry having pipelined architecture. During post-configuration operation of such implementations, the operation unit performs a sequence of operations (determined by the values written to registers thereof during the configuration phase) on audio data in pipelined fashion. For example, an arithmetic unit of such an operation unit comprises pipelined multiply and accumulate circuitry and pipelined addition/subtraction circuitry, and is configured (during the configuration phase in response to configuration bits) by placing logic thereof in a state that determines a specific processing pipeline to be employed during post-configuration operation.

In another class of embodiments, the invention is a method for configuring an operation unit comprising circuitry having pipelined architecture, said method including the steps of:

(a) defining a multi-step operation to be performed by the operation unit, said operation including at least one matrix multiplication of a data vector and a matrix comprising X coefficients exhibiting symmetry, where X is a number;

(b) determining a sequence of configuration commands and configuration data for configuring the operation unit to perform the matrix multiplication; and (c) asserting to the operation unit configuration bits, determined by the sequence of configuration commands and configuration data, thereby configuring the operation unit to perform the matrix multiplication, wherein the configuration bits determine signs of all X of coefficients but magnitudes of only Y of the coefficients, where Y is less than X.

In some embodiments, the multi-step operation defined in step (a) includes the step performing the matrix multiplication to multiply an audio data vector by said matrix. In some embodiments, the multi-step operation defined in step (a) is one of a T/F transform and an F/T transform on data (e.g., audio data).

In another class of embodiments, the invention is a method for configuring an operation unit comprising circuitry having pipelined architecture, said method including the steps of:

(a) defining a multi-step operation to be performed by the operation unit, said operation including steps of performing successive addition and subtraction operations on each pair of operands of a sequence of operand pairs;

(b) determining a sequence of configuration commands and configuration data for configuring the operation unit to access a sequence of pairs of data values and perform the successive addition and subtraction operations on said sequence of pairs of data values; and (c) asserting to the operation unit configuration bits, determined by the sequence of configuration commands and configuration data, thereby configuring the operation unit to access the sequence of pairs of data values and operate in an alternating addition/subtraction mode to perform the successive addition and subtraction operations on each pair of data values of the sequence of pairs of data values.

In some embodiments, the multi-step operation defined in step (a) is one of a T/F transform and an F/T transform on data (e.g., audio data).

In another class of embodiments, the invention is a method for configuring an operation unit comprising circuitry having pipelined architecture, said method including the steps of:

(a) defining an operation to be performed by the operation unit, said operation including performance of repetitive processing on a sequence of data values stored in a memory in memory locations having consecutive addresses;

(b) determining a sequence of configuration commands and configuration data for configuring the operation unit to access the sequence of data values and perform said repetitive processing thereon; and (c) asserting to the operation unit configuration bits, determined by the sequence of configuration commands and configuration data, thereby configuring the operation unit to operate in a non-consecutive addressing mode to access the data values from a predetermined sequence of the memory locations having non-consecutive addresses.

In some embodiments, the multi-step operation defined in step (a) is one of a T/F transform and an F/T transform on data (e.g., audio data).

Other aspects of the invention are an audio encoder including any embodiment of the inventive system, an audio decoder including any embodiment of the inventive system, and a portable media player (or another portable data processing system or a data processing system not intended to be portable) including such an audio encoder and/or such an audio decoder. Other aspects of the invention are configuration units and operation units for use in any embodiment of the inventive system, and methods performed during operation of any embodiment of the inventive system, configuration unit, or operation unit.

Figure 4:
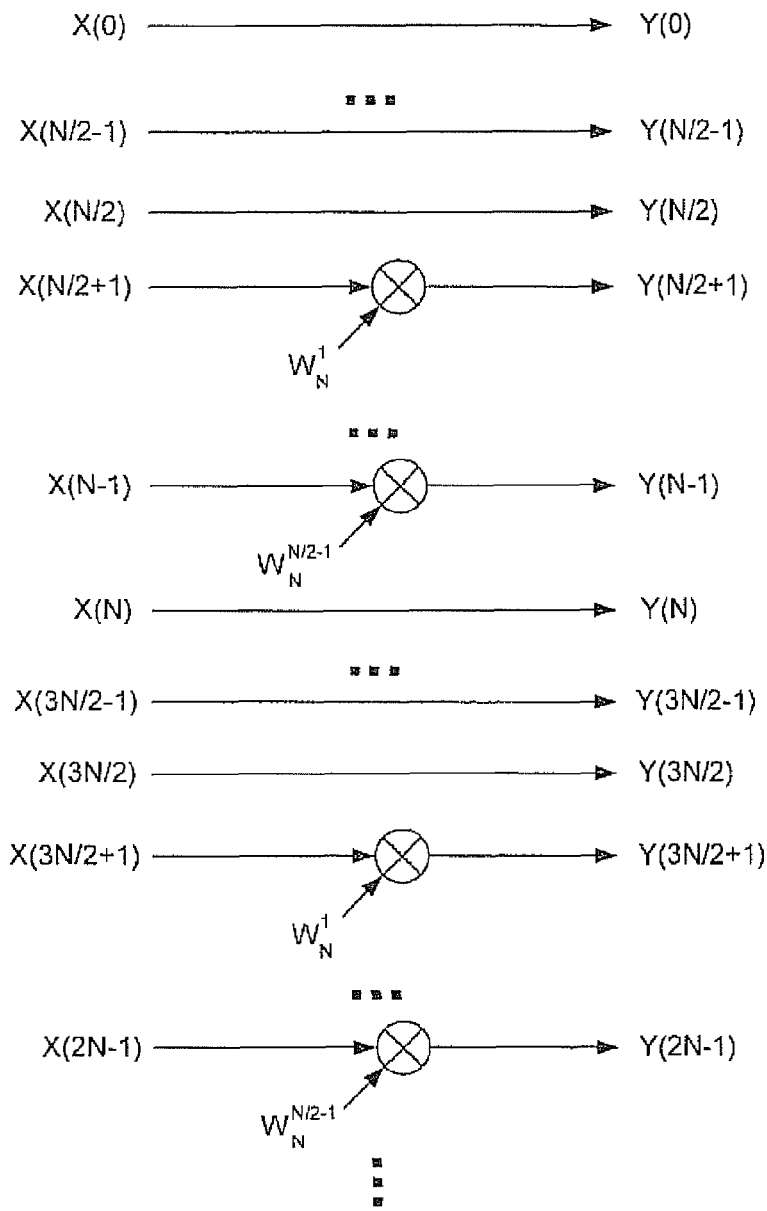
FIG. 4 is a partial IFFT signal flow graph that shows multiplication of some coefficients of a set of pre-modulated frequency-domain coefficients X(k), by twiddle factors of form $$W_N^k = e^{\frac{2\pi k}{N}}.$$

All inputs and outputs in FIG. 4 are complex values.

Figure 5:
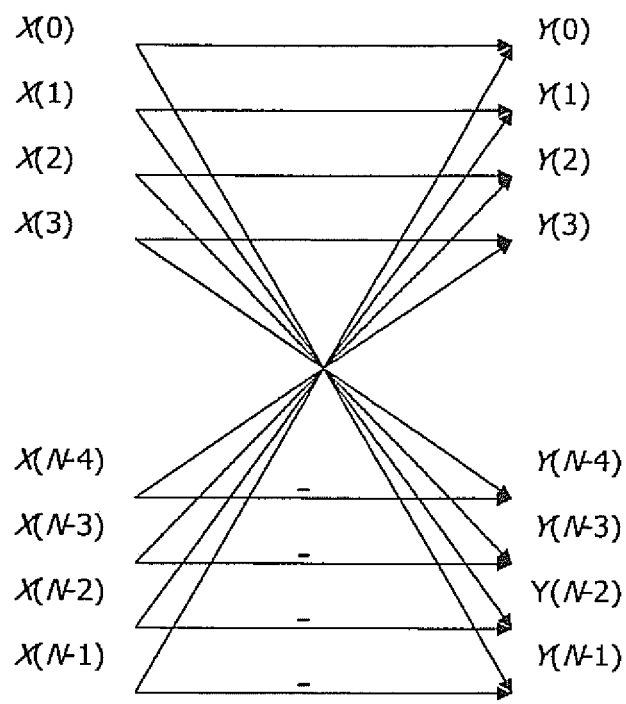

FIG. 5 is a signal flow graph that shows operations performed in the IFFT stage of an exemplary inverse MDCT, to generate a sequence of output values Y(k) in response to a set of input values X(k).

Figure 6:
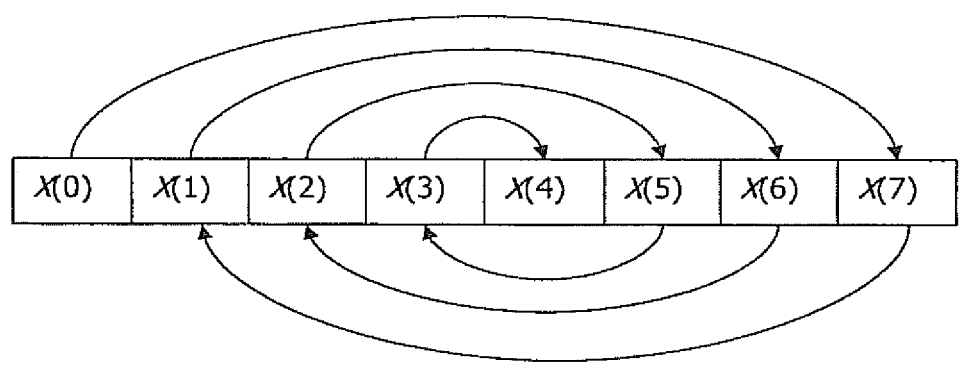

FIG. 6 is a diagram of a first butterfly addressing mode in which an operation unit can be pre-configured (in accordance with an embodiment of the invention) to operate.

Figure 7:
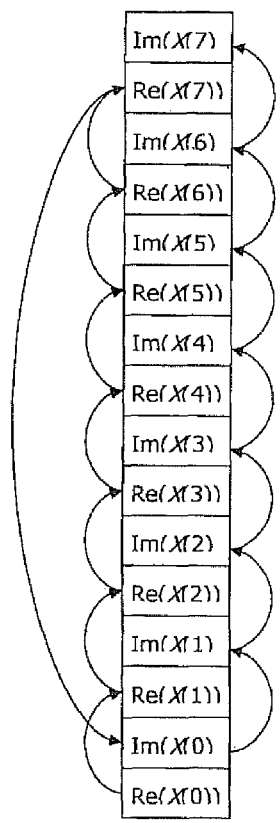

FIG. 7 is a diagram of a second butterfly addressing mode in which an operation unit can be pre-configured (in accordance with an embodiment of the invention) to operate.

Figure 8:
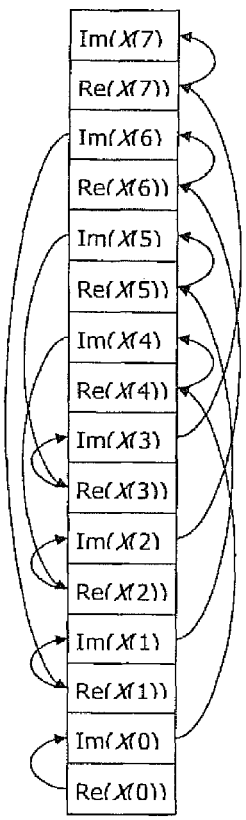

FIG. 8 is a diagram of a first bit-reversed addressing mode in which an operation unit can be pre-configured (in accordance with an embodiment of the invention) to operate.

Figure 9:
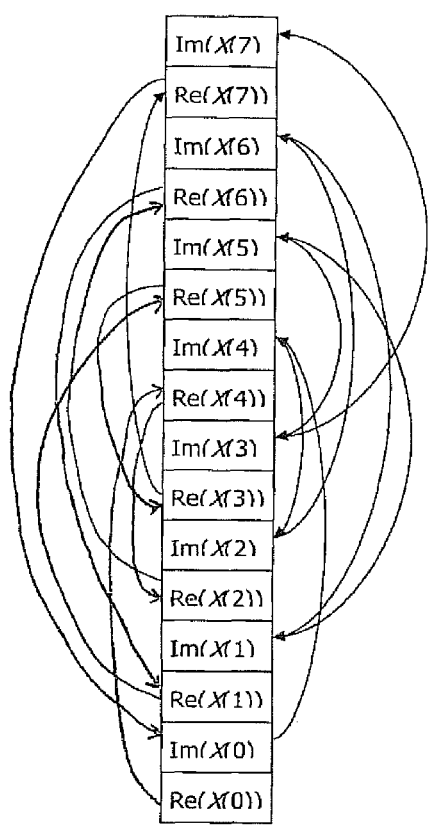

FIG. 9 is a diagram of a second bit-reversed addressing mode in which an operation unit can be pre-configured (in accordance with an embodiment of the invention) to operate.

Figure 10:
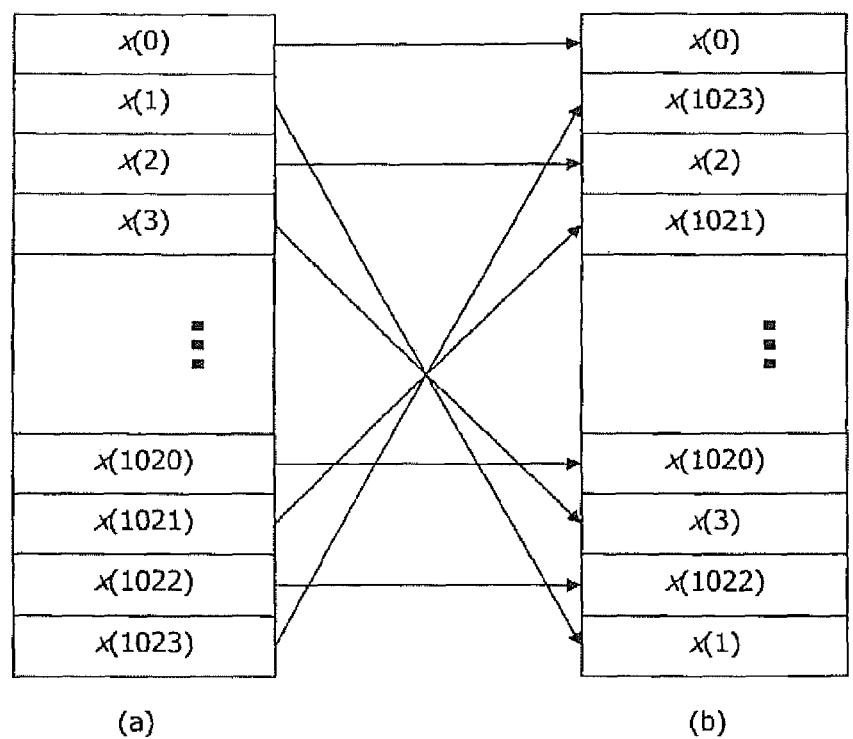

FIG. 10 (consisting of FIG. 10(*a*) and FIG. 10(*b*)) is a diagram of the order in which data (stored in an external memory as indicated in FIG. 10(*a*)) are read from the external memory and written into an input buffer of an operation unit (i.e., the order indicated in FIG. 10(*b*)) in a third butterfly addressing mode in which the operation unit can be pre-configured (in accordance with an embodiment of the invention) to operate.

Figures 11, 12:
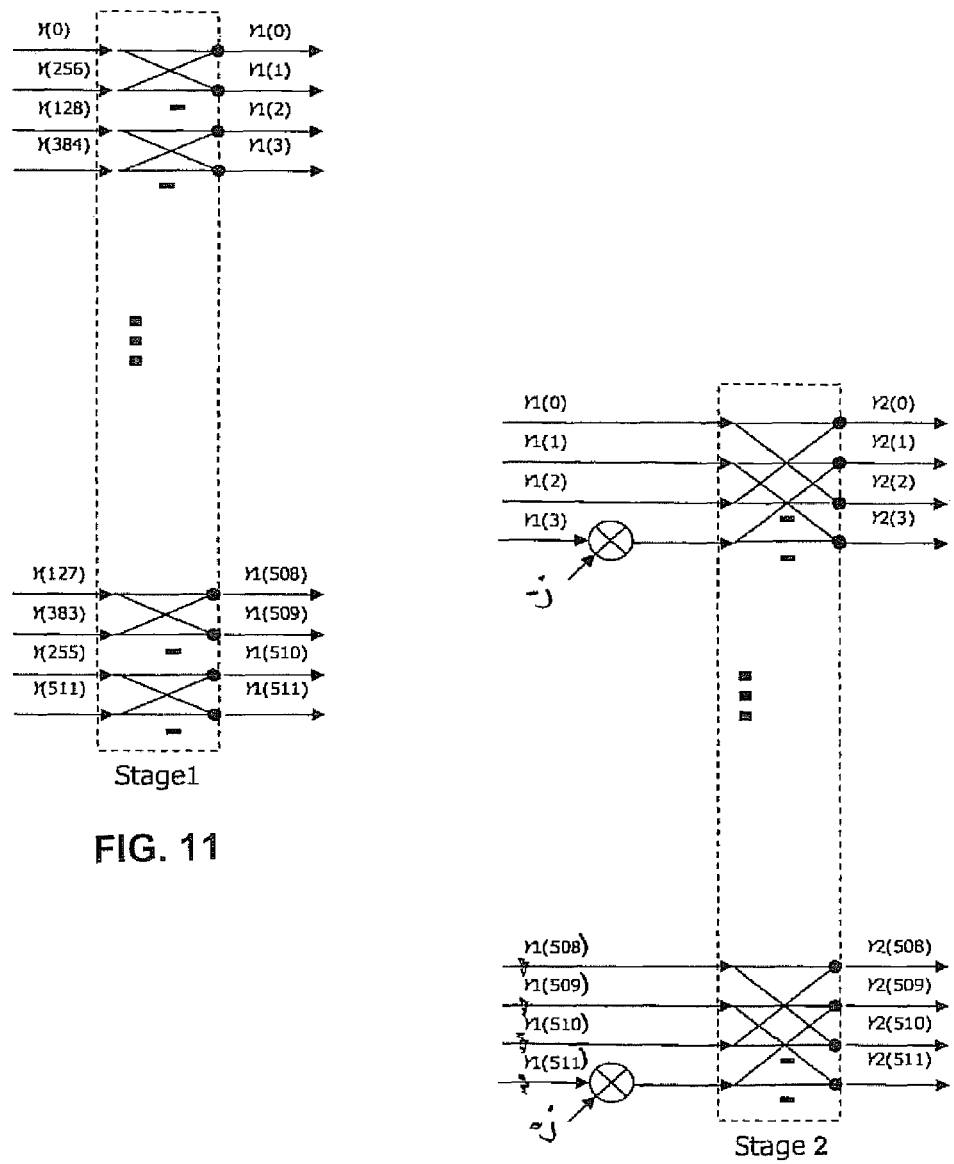

FIG. 11 is a signal flow graph of the first stage of the IFFT phase of an exemplary inverse MDCT.

FIG. 12 is a signal flow graph of the second stage of the IFFT phase of an exemplary inverse MDCT.

Figure 13:
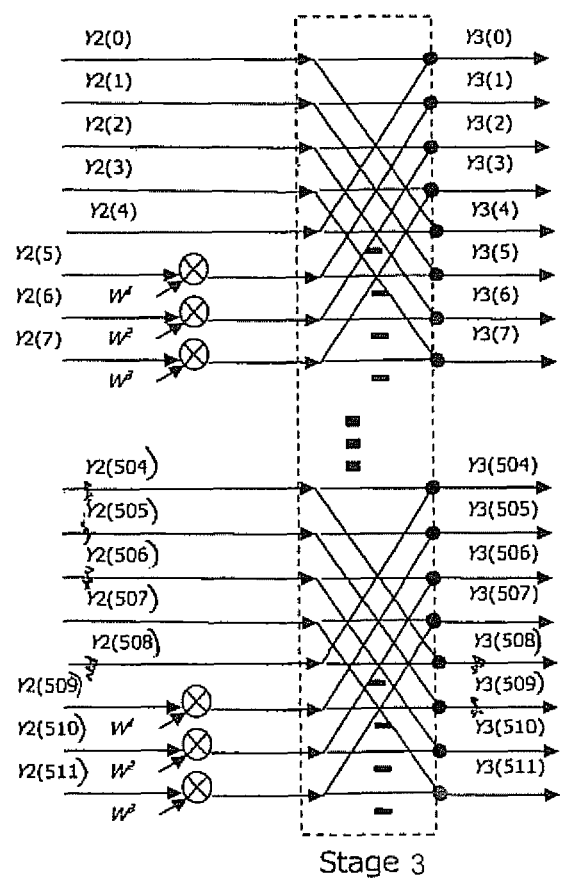

FIG. 13 is a signal flow graph of the third stage of the IFFT phase of an exemplary inverse MDCT.

DETAILED DESCRIPTION OF PREFERRED EMBODIMENTS

Figure 1:
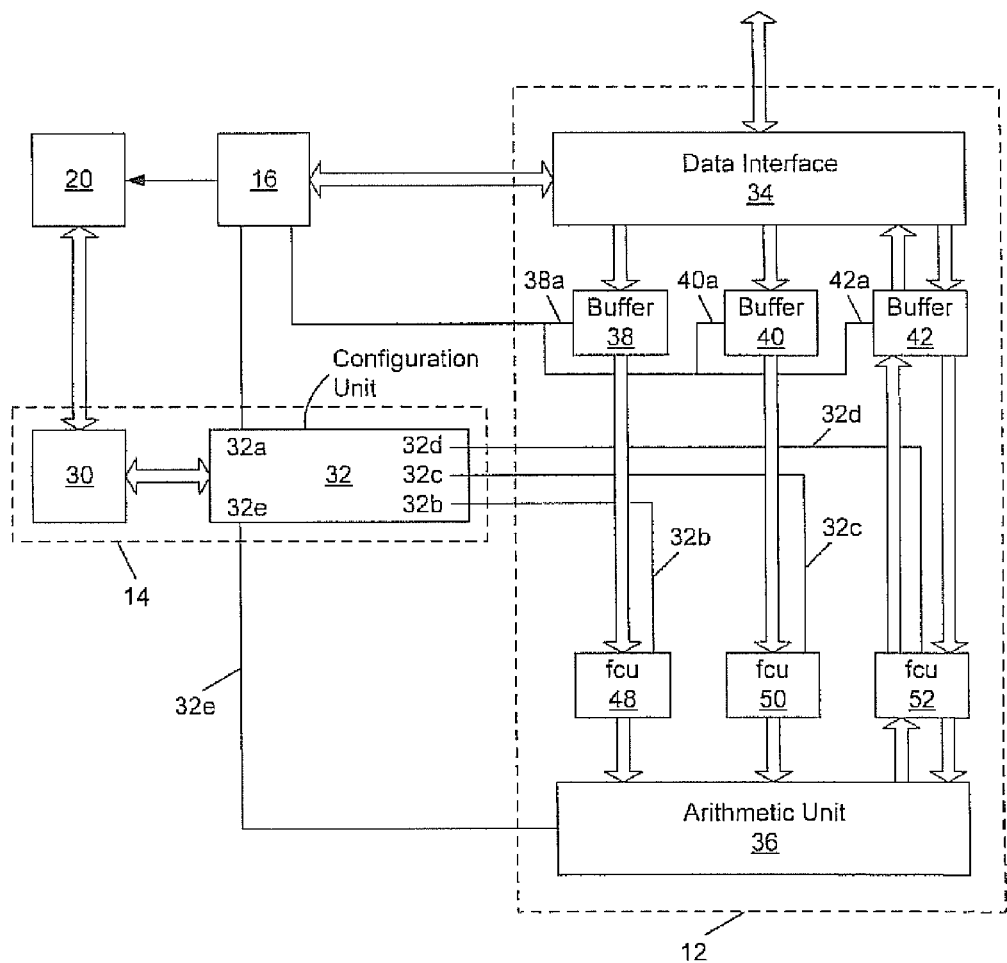
FIG. 1 is a block diagram of a processing system of a type described in above-cited U.S. patent application Ser. No. 11/243,292, which can be implemented and operated in accordance with a class of embodiments of the invention.
Figure 3:
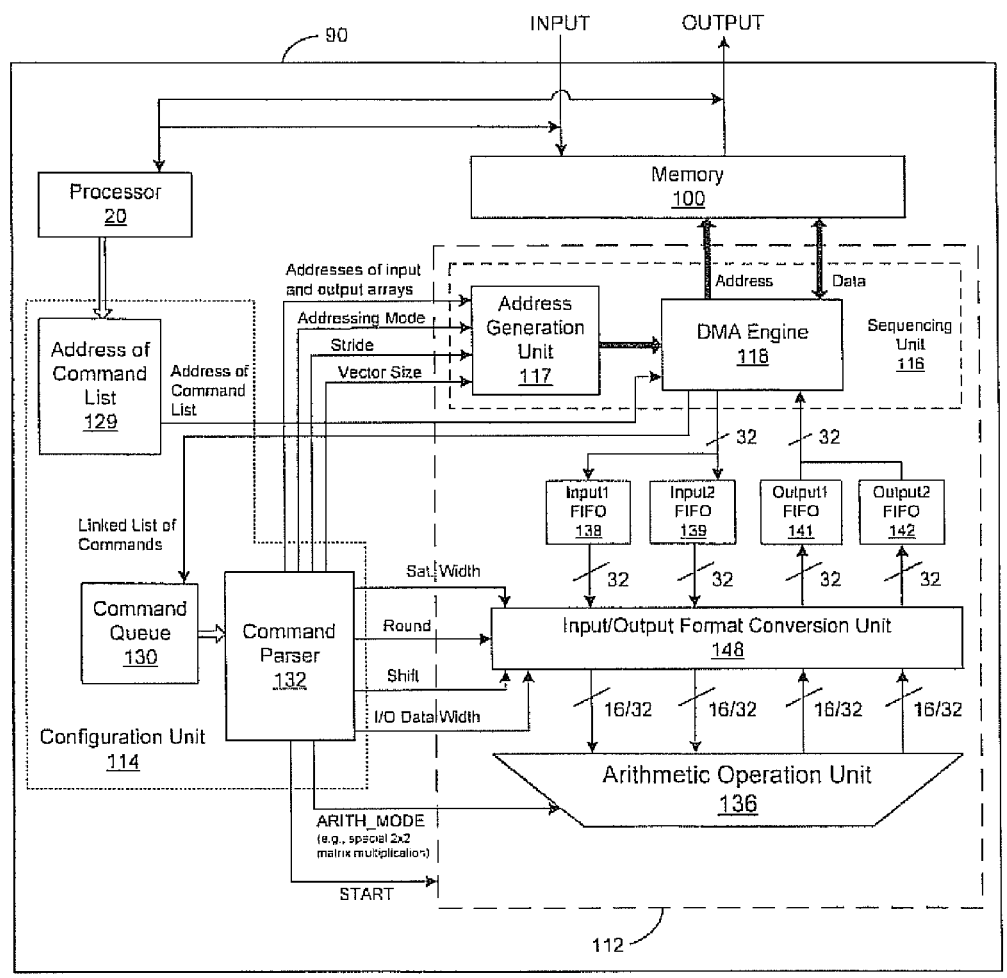
FIG. 3 is a block diagram of a processing system that can be implemented and operated in accordance with a class of embodiments of the invention.

A class of embodiments of the inventive system will be described with reference to FIGS. 1 and 3. FIG. 1 is a block diagram of a processing system described in above-cited U.S. patent application Ser. No. 11/243,292, which can be implemented and operated in accordance with a class of embodiments of the invention. FIG. 3 is a block diagram of another processing system that can be implemented and operated in accordance with a class of embodiments of the invention. The system of FIG. 1 or FIG. 3 can be implemented as a subsystem of a portable media player (or another portable data processing system or a data processing system not intended to be portable) that includes additional elements that are not shown in FIG. 1 or 3.

Above-cited application Ser. No. 11/243,292 discloses systems and methods for performing repetitive tasks (e.g., matrix multiplications and other operations) with improved power and computational efficiency. In a typical embodiment (shown in FIG. 1), such a system is a co-processor including operation unit 12, configuration control unit 14, and a data retrieval unit 16. Operation unit 12 includes arithmetic unit 36 and can be configured to perform a variety of repetitive tasks, and configuration control unit 14 can configure unit 12 in response to system configuration or operation mode instructions from an external processor 20. During post-configuration operation, data retrieval unit 16 retrieves data from memory and delivers the data in an appropriate format to the configured operation unit 12 so that an operation can be performed on the data in unit 12 (where the term "operation" denotes either an individual instruction, a sequence of instructions, or complex task comprising a long series of instructions).

To configure operation unit 12, processor 20 sends configuration or operation mode instructions to configuration control unit 14, and unit 14 uses these instructions to configure unit 12. After unit 12 has been configured, unit 12 begins to operate (typically in response to a start operation signal from processor 20), data retrieval unit 16 accesses memory to retrieve data, and the retrieved data are formatted and operated upon by operation unit 12. The data output from operation unit 12 are delivered (via data retrieval unit 16) to or stored at a desired location, based on instructions from processor 20. Data retrieval unit 16 is also in communication with processor 20 and can provide an interrupt signal to processor 20 as necessary.

Configuration control unit 14 includes command or configuration interface unit 30 and configuration unit 32. Configuration unit 32 can include five configuration unit interfaces 32a-32e (the number of configuration unit interfaces will vary depending on the number of operation control units or data retrieval units that are in communication with configuration unit 32).

Interface unit 30 is in communication with processor 20, so that processor 20 can sends configuration information to interface unit 30. The configuration information can provide the configuration set-up and operation mode of unit 12 and the location of the data upon which the operation is to be performed. Interface unit 30 is capable of translating between the protocol used by processor 20 and each protocol used by configuration unit 32, and produces translated configuration information that is sent to configuration unit 32. Based on configuration information provided by processor 20, configuration unit 32 is configured using programmable registers in unit 32. The programmable registers control configuration unit interfaces 32a-32e.

Configuration unit 32 provides configuration information to arithmetic unit 36 through configuration unit interface 32e (e.g., to establish the sequence, frequency, and type of operation that will be executed by unit 36). Configuration unit 32 is also in communication with data retrieval unit 16 through configuration unit interface 32a.

Based on the configuration information, data retrieval unit 16 retrieves and sends the appropriate data to data interface 34 of unit 12. Data interface unit 34 is coupled to input buffer 38, state buffer 40, and output buffer 42. Buffers 38, 40, and 42 are in communication with data retrieval unit 16 through links 38a, 40a, and 42a, respectively, so that data retrieval unit 16 can provide configuration information as well as data directly to each of buffers 38, 40, and 42 while allowing each of buffers 38, 40, and 42 to communicate information to the data retrieval unit. Thus, buffers 38, 40, and 42 can be configured and initialized during the configuration process. Depending on the type of operation, the function of the input and output buffers may be interchanged for a specific arithmetic task or operation. Input buffer 38 is coupled to format conversion unit (FCU) 48 and state buffer 40 is coupled to format conversion unit 50. Format conversion units 48 and 50 are coupled to arithmetic unit 36 and in communication with configuration unit 32 through configuration interfaces 32b and 32c, respectively. Format conversion units 48 and 50 convert the format of the data from data interface unit 34 to the format needed by arithmetic unit 36 based on the configuration information received from unit 32 and the format of the operation to be performed by arithmetic unit 36.

Data interface unit 34 is also coupled to output buffer 42. Since the output of arithmetic unit 36 may be in a format different from that required for output buffer 42, the data output from unit 36 are sent to format conversion unit 52. Format conversion unit 52 converts, as necessary, the format of this output data to the format necessary for output buffer 42. For example, format conversion unit 52 can perform range saturation conversions, arithmetic shifts, rounding control, and 64-to-32-bit conversions based on set-up or configuration information received during the configuration process from configuration unit 32 via configuration interface 32d. Output buffer 42 provides feedback to arithmetic unit 36, which can be used during a subsequent operation, depending on the configuration information provided by processor 20.

Once an operation has been performed and the final result is available at output buffer 42, the output data are sent to data interface unit 34. Data interface unit 34 converts the data to the necessary protocol for storage at a designated memory location or delivery to an identified address.

Optionally, command interface unit 32 includes a buffer or memory to store a sequence of commands or instructions from processor 20, and can execute a next instruction upon completion of a current instruction. Also optionally, command interface unit 32 can store additional configuration information so that once an operation is complete and the output has been sent to the desired location, unit 32 can start another configuration of unit 12. Optionally, configuration information and operation instructions are combined and stored in one location. With both the configuration information and operation instructions available, once a configuration has been completed, the operation can automatically begin without configuration unit 32 having to signal processor 20 that the configuration process is complete and await operation instructions.

Figure 2:
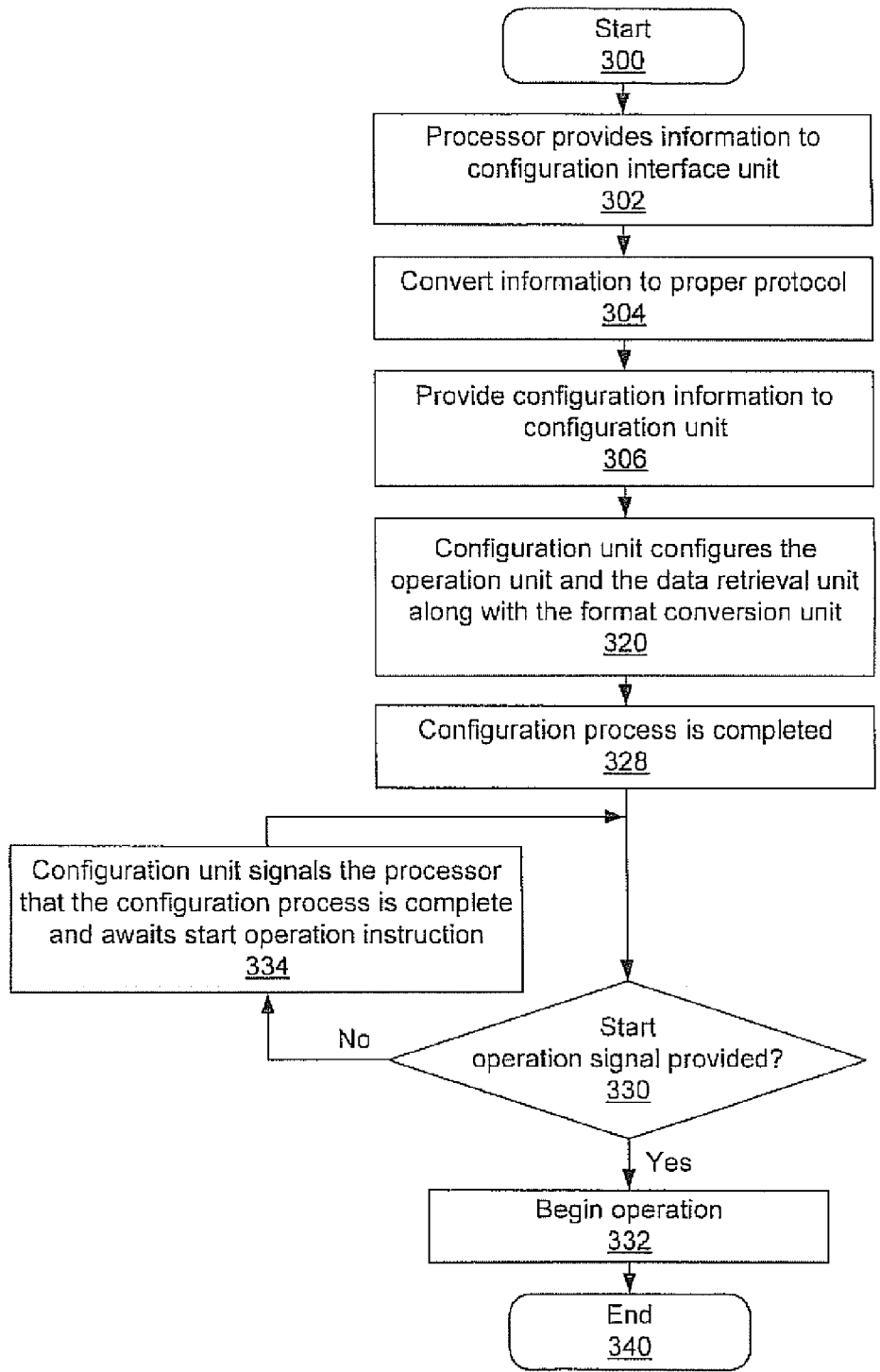
FIG. 2 is a block diagram of a processing system (having video decoding capability) that can be implemented in accordance with the invention.

With reference to FIG. 2, we next describe an example of the manner in which unit 12 (including arithmetic unit 36) can be configured. The process begins at step 300. At step 302, processor 20 provides configuration information to interface unit 30. At step 304, interface unit 30 translates the configuration information to the protocol needed by configuration unit 32. At step 306, the translated configuration information is sent from interface unit 30 to configuration unit 32. At step 320, configuration unit 32 uses the configuration information to configure arithmetic unit 36 and data retrieval unit 16, and also configures format conversion units 48, 50, and 52 based on the configuration information. At step 328 the configuration process is completed.

At step 330, configuration unit 32 determines if processor 20 has already provided a command or instruction to initiate an operation by unit 12. If it is determined at step 330 that an "initiate operation" command or instruction has been provided, then (at step 332) unit 32 causes unit 12 to begin the operation. If at step 330 configuration unit 32 determines that no initiate operation command or instruction has been provided, then (at step 334) unit 14 signals the processor that the configuration process is completed and awaits an initiate operation command or instruction from the processor. The operation begins at step 332 and ends at step 340. If at step 330 the initiate operation command or instruction has not been provided, unit 32 awaits the initiate operation command or instruction and the process returns to step 330.

Once operation unit 12 is configured, it can perform the operation for which it has been configured. The duration of time needed to complete configuration relative to the type of operation is variable. In some cases, the time for completing the operation is long relative to the configuration time, while in other cases it is short relative to the configuration time.

Consider exemplary operations described by equations (3) and (4), which can be performed by the FIG. 1 system:

$$Y(i) = \Sigma a(j)*X(i-j) + \Sigma b(k)*Y(i-1-k) \qquad (3)$$

where $i=0, 1, \ldots, N-1$; $j=0, 1, \ldots, M-1$; $k=0, 1, \ldots, L-1$; and $$Y = A*X \qquad (4)$$

where X is an (M×N) matrix.

Equation (3) describes a second order infinite impulse response (IIR) filter with M coefficients in the forward direction, which operate on the inputs, and L coefficients in the backward direction, which operate on the feedback from output buffer 52. In order for the filtering operation to proceed correctly, some initialization of the input and output buffers of FIG. 1 is necessary. This initialization is part of the configuration information and the configuration process.

To configure unit 12 of FIG. 1 to perform the operation defined by equation (3) to generate N output samples, a user determines the M+L coefficients a(j) and b(k), which can be 24-bit coefficients and provides them to processor 20 using an input device (e.g., a keyboard). In one specific case, M=3 and L=2. A rounding value at the end of each arithmetic unit task is also specified. In response, processor 20 provides configuration information to interface unit 30 which in turn asserts configuration instructions to configuration unit 32. During the configuration phase, the filter coefficients needed for the filtering operation are asserted to state buffer 40, and the parameters needed to configure format conversion unit 52 to perform the conversion needed by output buffer 42 (including the saturation rounding and arithmetic shifting needed by the filter) are also asserted to unit 12. For example, 24-bit right shifting and 24-bit signed saturation may be required.

The user also provides to processor 20 configuration information for vector operations and buffers. For example, the user provides information relating to the source of the input samples and the destination of the output samples. Typically also, the user provides information relating to the length of required vector operations. Using this information, arithmetic unit 36 and other elements of unit 12 are configured so as to be ready for operation.

After the unit 12 is configured, in order to perform the operation determined by equation (3), a sequencing unit or data retrieval unit provides the input data to arithmetic unit 36. The output of arithmetic unit 36 is sent to the format conversion unit 52 and then to output buffer 42 in a pipelined manner.

To configure the FIG. 1 system to perform an 8×12 matrix multiplication operation of the type described in Equation (4) with 32-bit inputs, and 24-bit coefficients and outputs as follows:

Y={Y0;Y1} is a 2×1 matrix;

A={a00,a01,a02,a03,a04,a05,a06,a07,a10,a11,a12,a13,a14,a15,a16,a17} is a 2×8 matrix; and X={x0,x1,x2,x3,x4,x5,x6,x7} is an 8×1 matrix, processor 20 sends command information to configuration unit 14 directing unit 14 to set up a matrix multiplication operation with a matrix having 2 rows and 8 columns of coefficients, and to configure format conversion unit 52 with the conversion needed by output buffer 42, including the saturation rounding and arithmetic shifting needed by the filter.

Processor 20 directs configuration unit 14 to fill state buffer 40 with the coefficients needed for the matrix calculation. In the present example there are 16 matrix coefficients at 24-bit resolution. The configuration unit, based on information from the processor, configures the format conversion units with the conversion needed by the output buffer, including the saturation and the arithmetic shifting that is needed by the matrix calculation. In the present example, there is a 24-bit right shift and a 24-bit saturation rounding. Processor 20 also instructs configuration unit 14 to set up vector operations, and to configure the buffers with information about where the input samples are coming from and where the output samples should go, length of the vector operation, and so on, in order to configure unit 12 to be ready to perform the operation of equation (4).

Typically, once operation unit 12 is configured, processor 20 signals the system to initiate operation. Such a signal can be provided along with the configuration information or upon a response from configuration unit 14 that the system is ready to perform the desired operation. The system will determine, based on available resources, if the repetitive tasks needed to perform the operation should be split into multiple cycles. Data retrieval unit 16 provides to arithmetic unit 36 the necessary data to complete the operation. The output of arithmetic unit 36 is sent to format conversion unit 52 and then to output buffer 42 in a pipelined manner. The output from arithmetic unit 36 can be used as feedback in a subsequent iteration. Upon completion of the operation, the data in output buffer 42 is sent to data interface unit 16 to be stored or sent to a desired memory location.

Aspects of the present invention are methods for configuring and operating a system having the hardware-accelerator micro-architecture of FIG. 1 or 3 (or variations on such architecture) to perform a forward or inverse MDCT (or other DCT), and configurable systems (e.g., those having the structure of FIG. 1 or 3) that have been so configured. Due to its configurable architecture, the system of FIG. 1 or 3 can be configured in accordance with the invention to perform forward and inverse DCTs (e.g., MDCTs) efficiently and in a manner consuming low power. For brevity the following description concentrates on how to configure such a system to perform an inverse MDCT (for example, so that the system can function as an element of an audio decoder). However, it is also within the scope of the invention to configure a system to perform a forward DCT (e.g., a forward MDCT), for example, so that the system can function as an element of an audio encoder FIG. 3 is a block diagram of processing system 90 which can be an audio encoder, an audio decoder, or a portable media player (or another portable data processing system or a data processing system not intended to be portable) including such an audio encoder and/or such an audio decoder. In FIG. 3, input data (e.g., audio data to be encoded or decoded, and/or commands, control data, and/or other data) are asserted to processor 20 and/or stored in memory 100. Output data (e.g., encoded or decoded audio data) can be asserted (e.g., for playback) by processor 20 to an output of system 90 and/or asserted from memory 100 to an output of system 90.

System 90 of FIG. 3 includes a processing subsystem (sometimes referred to herein as a processing "system" or as a "co-processor") comprising memory 100, operation unit 112, and configuration control unit 114, connected as shown. System 90 also includes external processor 20 coupled and configured to assert to unit 114 at least one address of system configuration and/or operation mode commands and data for configuring the FIG. 3 co-processor, and typically includes other elements (not shown) for performing conventional functions (e.g., a display subsystem, e.g., for displaying menus and playlists). The co-processor of FIG. 3 can be configured and operated (with processor 20) in accordance with a class of embodiments of the invention.

Operation unit 112 of FIG. 3, which includes sequencing and data retrieval unit 116 and arithmetic unit 136, can be configured by unit 114 (in response to system configuration commands and data specified by processor 20) to perform a variety of repetitive tasks. During post-configuration operation, data retrieval unit 116 retrieves data from memory 100 (or from one or both of output buffers 141 and 142) and delivers the data to one or both of input buffers 138 and 139.

Input buffers 138 and 139 are coupled to format conversion unit 148, and either one of buffers 138 and 139 can function as a state buffer which performs a function identical or similar to that performed by state buffer 40 of FIG. 1 (e.g., buffer 138 can function as an input buffer that holds elements of an input data vector and buffer 139 can function as an state buffer that holds matrix coefficients to be multiplied with the input data elements). Format conversion unit 148 is coupled to arithmetic unit 136 and in communication with configuration unit 132 (of unit 114). Format conversion unit 148 performs any necessary format conversion on the data from buffer 138 and/or buffer 139 to place the data in the format needed by arithmetic unit 136 based on the configuration information received from unit 132. For example, format conversion unit 148 can perform range saturation conversions, arithmetic shifts, rounding choices, and 64-to-32-bit conversions based on configuration information received during the configuration phase from unit 132. Output buffer 141 and/or output buffer 142 can provide feedback to arithmetic unit 136 (via DMA engine 118 and one or both of buffers 138 and 139) for use during a subsequent step or operation, depending on the configuration information provided by unit 132.

Configuration unit 114 includes an interface unit (not shown in FIG. 3, but which can be identical to unit 30 of FIG. 1) that can be coupled to external processor 20 to receive at least one address (of system configuration commands and data for configuring the FIG. 3 co-processor) sent from processor 20 in response to a user command. Each such address is stored in register 129 of unit 114, and then asserted to DMA (direct memory access) engine 118 of sequencing unit 116. In response, DMA unit 118 retrieves a sequence of configuration commands and configuration data (a "configuration list") from the corresponding storage locations in memory 100 and asserts the configuration list to registers 130 of unit 114.

Typically, the configuration list includes a sequence of configuration commands (each specifying a register of unit 112 to be configured) and configuration data specifying the data content to be stored in each such register of unit 112. Typically, each configuration command specifies a register of unit 112, and is followed in the list by one or more words of configuration data specifying the content to be stored in such register of unit 112. The registers of unit 112 to be configured in response to the configuration list can include registers (to be described) in address generation unit 117 and DMA engine 118 of unit 116, in format conversion unit 148, and in arithmetic unit 136. When configured, the registers of unit 112 determine unit 112's configuration and operation mode, including each operation to be performed by unit 136, the location(s) of the input data upon which unit 136 is to operate, and the location(s) to which the output data generated by unit 112 are to be written.

During a configuration phase, unit 114 configures unit 112 to perform a sequence of post-configuration operations (typically including a multi-step operation to be executed by arithmetic unit 136). During the configuration phase, unit 114 asserts to DMA engine 118 of sequencing unit 116 each configuration list address stored in register 129. In response, DMA unit 118 retrieves the configuration list (of configuration commands and data) from memory 100, and asserts the list to unit 114 which stores the list in register 130. Then, still during the configuration phase, command parsing unit 132 of unit 114 parses each command (and data word) in the configuration list to generate configuration and control bits which it then asserts to the appropriate registers of unit 112. The configuration and control bits asserted from unit 132 to unit 112 determine the kind of sequencing needed between different task iterations of arithmetic unit 136 and also between different operations within each configured arithmetic task.

When unit 114 has configured unit 112, no more interaction is necessary between unit 114 and the user, except that in some embodiments, a user may cause processor 20 to assert a "start" command to unit 114 after configuration. In response to the start command, unit 132 asserts a "start" control bit or word to the configured unit 112 to cause it to begin to execute the operation that it has been configured to perform. In typical embodiments, the configuration list (that has been accessed from memory 100 by DMA engine 118 and stored in register 130) includes a "start" command. As the last step in a configuration phase (in which unit 132 has read a sequence of commands and data values from register 130), unit 132 reads the start command from register 130 and, in response, asserts a "start" control bit or word to the configured unit 112 to cause unit 112 to begin to execute the operation that it has been configured to perform. During post-configuration operation, arithmetic unit 136 of unit 112 performs a sequence of operations determined by the values written to registers of unit 112 during the configuration phase.

In preferred implementations, the operation unit (e.g., unit 112 of FIG. 3) of the inventive system comprises circuitry having pipelined architecture. During post-configuration operation of such implementations, the operation unit performs a sequence of operations (determined by the values written to registers thereof during the configuration phase) on audio data in pipelined fashion. For example, an arithmetic unit of such an operation unit comprises pipelined multiply and accumulate circuitry and pipelined addition/subtraction circuitry, and is configured (during the configuration phase in response to configuration bits) by placing logic thereof in a state that determines a specific processing pipeline to be employed during post-configuration operation.

The configuration bits asserted from command parser 132 to address generation unit 117 of unit 112 during the configuration phase preferably include bits that determine addresses of input data to be processed, addresses to which output data generated by unit 112 should be asserted, bits that determine addressing mode and stride (to be described below) and vector size. In response, unit 117 generates and asserts to DMA engine 118 all addresses needed by DMA engine 118 to perform the memory access steps of the operation to be performed by unit 112, including required data assertions to input buffer 138 and/or input buffer 139, data reads from output buffer 141 and/or output buffer 142, and accesses to memory 100.

Also during the configuration phase, command parser 132 asserts configuration bits to format conversion unit 148. These configuration bits typically include bits that determine saturation width, saturation rounding, arithmetic shifting, and I/O data width for the operation to be performed by unit 112.

Also during the configuration phase, command parser 132 asserts configuration bits to arithmetic unit 136, configure unit 112 to perform the user-specified operation.

During post-configuration operation, sequencing unit 116 retrieves data from memory 100 (or from one or both of output buffers 141 and 142) and asserts the data to one or both of input buffers 138 and 139. The data are asserted from buffer 138 and/or buffer 139 to the pre-configured format conversion unit 148, in which they undergo any necessary reformatting. The data output from unit 148 are asserted in the appropriate format to the pre-configured arithmetic unit 136 so that the predetermined operation can be performed thereon. The data output from arithmetic unit 136 undergo any necessary reformatting in unit 148, and are asserted in the appropriate format to at least one of buffers 141 and 142, for retrieval by DMA engine 118 of unit 116 and assertion to the appropriate buffer or memory location.

We next describe examples of how to configure a system (e.g., that of FIG. 1 or FIG. 3) in accordance with the invention to perform an inverse MDCT, with the inverse MDCT implemented as three operations on input frequency-domain coefficients X(k): pre-modulation followed by an FFT, and finally post-modulation.

The system is preferably configured to perform the pre-modulation and post-modulation in an efficient manner that reduces or minimizes the number of coefficients that must be retrieved to perform each matrix multiplication (e.g., a 2×2 matrix multiplication) required for the pre-modulation and post-modulation.

As described above with reference to equation (2), it is conventional to implement an inverse MDCT on frequency coefficients X(k) by determining time-domain values g(n)=post-modulation(IFFT(pre-modulation(G(k))), where Re(G(k))=−X(2k) and Im(G(k))=X(N/2−2k−1) for k=0, . . . , N/4.

The pre-modulation of a complex sequence, G(k), is multiplication by the complex exponential sequence $e^{(j \cdot 2\pi(k+\theta)/N)}$, where $j=\sqrt{-1}$. During an inverse MDCT, the IFFT phase involves multiplication of a complex sequence of pre-modulated complex coefficients G'(k) by factors (sometimes referred to as "twiddle factors") of the form $e^{(j \cdot 2\pi k)/(N/4))}$. During an inverse MDCT, the post-modulation phase involves multiplication of a complex sequence of time-domain coefficients (resulting from the IFFT phase) by a complex exponential sequence $e^{(j \cdot 2\pi(n+\phi)/4N)}$.

In general, the repetitive steps of multiplication by a complex exponential factor (during the pre-modulation, IFFT, or post-modulation phase) can be expressed as:

$$Re(y(m))=Re(x(m)) \cdot \cos(\theta_m) - Im(x(m)) \cdot \sin(\theta_m)$$

$$Im(y(m))=Re(x(m)) \cdot \sin(\theta_m) + Im(x(m)) \cdot \cos(\theta_m)$$

In matrix notation this can be expressed as:

$$\begin{bmatrix} Re(y(m)) \\ Im(y(m)) \end{bmatrix} = \begin{bmatrix} \cos(\theta_m) & -\sin(\theta_m) \\ \sin(\theta_m) & \cos(\theta_m) \end{bmatrix} \cdot \begin{bmatrix} Re(x(m)) \\ Im(x(m)) \end{bmatrix}.$$

In the pre-modulation, IFFT, and post-modulation phases, there may be a need to use the complex conjugate of the complex exponential or input sequence value to exploit the symmetry properties of inverse MDCT equation. Thus, the inventive system is preferably configurable to perform complex multiplications having any desired one of the four possible forms (cos(θ)+j sin(θ))·(Re(x)±jIm(x)). Preferred embodiments of the invention exploit the symmetry properties of each 2×2 matrix corresponding to these complex multiplications, such as the symmetry property that the diagonal elements of each matrix are equal in magnitude (though they may be opposite in sign) or the symmetry property that at least one element of each matrix is equal to the negative of its diagonal neighbor element, to reduce the number of memory accesses required to configure and operate the system.

Thus, preferred embodiments of the inventive system are configurable to multiply a sequence of specified input values by a specified 2×2 matrix during a pre-modulation phase, to multiply another sequence of specified input values by another specified 2×2 matrix (e.g., during an IFFT or other "intermediate transform" phase of an MDCT, or during execution of an operation of other type), and to multiply another sequence of specified input values by another specified 2×2 matrix during a post-modulation phase, with each 2×2 matrix specified in an efficient manner that advantageously utilizes its symmetry properties. Preferably, the matrix multiplication hardware (e.g., unit 12 of FIG. 1 or unit 112 of FIG. 3) of the inventive system is configurable (in response to configuration bits from a configuration unit) to perform matrix multiplication of a 2×1 vector (consisting of data values) by a 2×2 matrix to generate another 2×1 vector during a pre-modulation, IFFT (or other intermediate transform), or post-modulation phase, where the configuration bits specify the magnitudes of only two coefficients (identified herein as A1 and A2) of the matrix (or addresses of such magnitudes) and determine the signs of all four coefficients of the matrix. Preferably, during configuration of the matrix multiplication hardware, the configuration unit specifies the addresses of the two coefficients A1 and A2 (for retrieval by DMA engine 118) or asserts the coefficients A1 and A2 to the appropriate registers of the matrix multiplication hardware (e.g., to register 139 of FIG. 3). Preferably, the signs of the four matrix coefficients are determined independently by a two-bit (or four-bit) configuration bit-field (asserted to the matrix multiplication hardware) from the configuration unit. Such a bit-field can be a field of a matrix multiplication configuration command written to a register of the configuration unit (e.g., to register 130 of configuration unit 114 of FIG. 3). For example, the configuration bits asserted to the matrix multiplication hardware can configure the hardware in any of four ways, with the configuration bits including a two-bit field (b1,b2) whose values determines the signs of the matrix elements as follows:

the configuration determined by configuration bits including a bit-field (b1,b2)=(0,0) and coefficients A1,A2 is $$\begin{bmatrix} Y1 \\ Y2 \end{bmatrix} = \begin{bmatrix} A1 & A2 \\ -A2 & A1 \end{bmatrix} \cdot \begin{bmatrix} X1 \\ X2 \end{bmatrix};$$

the configuration determined by configuration bits including a bit-field (b1,b2)=(0,1) and coefficients A1,A2 is $$\begin{bmatrix} Y1 \\ Y2 \end{bmatrix} = \begin{bmatrix} A1 & A2 \\ A2 & -A1 \end{bmatrix} \cdot \begin{bmatrix} X1 \\ X2 \end{bmatrix};$$

the configuration determined by configuration bits including a bit-field (b1,b2)=(1,0) and coefficients A1,A2 is $$\begin{bmatrix} Y1 \\ Y2 \end{bmatrix} = \begin{bmatrix} -A1 & A2 \\ A2 & A1 \end{bmatrix} \cdot \begin{bmatrix} X1 \\ X2 \end{bmatrix};$$

the configuration determined by configuration bits including a bit-field (b1,b2)=(1,1) and coefficients A1,A2 is $$\begin{bmatrix} Y1 \\ Y2 \end{bmatrix} = \begin{bmatrix} A1 & -A2 \\ A2 & A1 \end{bmatrix} \cdot \begin{bmatrix} X1 \\ X2 \end{bmatrix}.$$

Thus, preferred embodiments of the invention may allow use of a smaller than conventional memory to store the matrix coefficients needed for performing 2×2 matrix multiplications (e.g., during a pre-modulation, IFFT, and/or post-modulation phase of an MDCT, or during an operation of another type). The memory (e.g., memory 100 of FIG. 3) need only store magnitudes of two coefficients (A1 and A2) rather than magnitudes of all four coefficients (and possibly a corresponding sign for each) as would otherwise be required. These embodiments have the advantage of reducing by a factor of at least two the storage requirements for the matrix coefficients for performing each 2×2 matrix multiplication. In addition to savings in coefficient memory storage space, these embodiments eliminate the need to use valuable processor cycles that would otherwise be spent in reading a full set of four conventionally stored coefficients from memory.

More generally, the inventive system preferably includes an operation unit configurable to perform an operation (e.g., a pre-modulation, IFFT, or post-modulation phase of an MDCT, two or more of such phases of an MDCT, or an operation of other type) including by performing at least one matrix multiplication by a matrix that exhibits symmetry. The system preferably also includes a configuration unit operable to configure the operation unit to perform the matrix multiplication by asserting to the operation unit a set of configuration bits that specify magnitudes of only some but not all (and signs of all) of the coefficients of the matrix (or addresses of such magnitudes). Where each matrix is a 2×2 matrix having four coefficients, the configuration bit set preferably specifies magnitudes of only two of the four coefficients and includes a configuration bit-field, consisting of a small number of bits (e.g., two bits or four bits), that determines the signs of all four of the coefficients.

In the IFFT stage of an inverse MDCT (implemented as a pre-modulation of input frequency-domain coefficients X(k), followed by the IFFT on the pre-modulated coefficients, and then a post-modulation of the values resulting from the IFFT), the twiddle-factors, $$W_N^k = e^{\frac{2\pi k}{N}},$$

are applied to some members of a set of pre-modulated frequency-domain coefficients (vector elements) x(k), specifically to elements x(N/2+k), x(3N/2+k), x(5N/2+k) . . . for k=1, . . . , (N/2<1), as shown in FIG. 4. All inputs and outputs in FIG. 4 are complex values. In order to apply twiddle-factor $W_N^k$ to all appropriate ones of the full set of elements of x(k), the system needs to generate addresses for elements x(N/2+k), x(3N/2+k), x(5N/2+k), . . . in sequence. Each complex value x is stored as a real part and an imaginary part Re(x), Im(x). Therefore a typical accessing sequence for the IFFT's k-th twiddle-factor multiplication requires that the system address the elements of x in following order: Re(x(N/2+k)), Im(x(N/2+k)), Re(x(3N/2+k)), Im(x(3N/2+k)), Re(x(5N/2+k)), Im(x(5N/2+k)), . . . , and so on. This means that the post-increments of data addresses (pointers) should follow the pattern: +1, 2N−1, +2, +2N−2, and so on.

When such an IFFT phase is performed by the inventive system (e.g., an appropriately configured FIG. 3 system), an address generation unit should provide (e.g., address generation unit 117 should assert to DMA engine 118) the appropriate sequence of data addresses (pointers) for accessing the appropriate sequence of elements of vectors of pre-modulated frequency-domain coefficients x(k) (e.g., a set of coefficients x(k) that has been generated by unit 112 during a previous pre-modulation phase and is stored in memory 100). Preferred embodiments of the inventive system implement an efficient addressing scheme which post-modifies such pointers (addresses of data values to be operated upon) based on two independent modifiers referred to herein as "strides." The first stride is called vector stride. The vector stride is the amount by which a previous address (of an element of a data vector) is incremented (or decremented) to determine the address of the next element of the vector to be accessed from memory, and it is applied to until all elements in the vector are read or written. In the FIG. 4 example, the vector size is 2N and the vector stride is +1.

The second stride is called matrix stride. It is applied once to modify the address of the last element of the most recently accessed vector to determine the next element to be accessed (the next element is an element of a new vector). After a matrix stride is applied, the vector stride is applied (typically, repeatedly applied) until the last element of the new vector has been accessed. In the FIG. 4 example, the matrix stride is 2N−1. A number of vector strides, and a single matrix stride, are applied alternately until the required number of operations on data is completed.

Consider another example in which vectors having two elements (vectors of size "2") are stored in memory, and elements x(k) of the vectors are to be accessed in accordance with a vector stride equal to 1 and a matrix stride equal to 7. In this example, the following sequence of data elements x(k) would be accessed in accordance with the invention: x(0), x(1), x(8), x(9), x(16), x(17), (24), and so on (where x(0) and x(1) are elements of a first vector, x(8) and x(9) are elements of another vector, and so on).

The inventive addressing scheme which post-modifies pointers (addresses of data to be operated upon) based on two independent strides (vector stride and matrix stride), determined during a configuration phase for use by an operation unit during a post-configuration operation, saves explicit modification of addresses and hence saves precious processing cycles. The operation unit of the inventive system (e.g., in address generation unit 117 of FIG. 3) can use vector stride and matrix stride values (received during configuration of the system and stored in a FIFO buffer) to determine a sequence of addresses for use in performing memory accesses (e.g., direct memory accesses performed by DMA engine 118 of FIG. 3) to the correct memory locations (e.g., locations of memory 100) in a manner reducing (or minimizing) the required number of data memory load cycles.

In the IFFT stage of an inverse MDCT (implemented as pre-modulation of input frequency-domain coefficients X(k), followed by the IFFT on the pre-modulated coefficients, and then post-modulation of the values resulting from the IFFT, the addresses of data values accessed from memory have a predictable pattern (a butterfly pattern). In preferred embodiments of the inventive system, the operation unit is configured to implement a butterfly addressing mode to access data values needed to perform such an IFFT operation (or another operation in which addresses of data values to be accessed from memory or written to memory have a predictable pattern). For example, in the FIG. 3 embodiment, operation of unit 116 in such a butterfly addressing mode can ensure that DMA engine 118 accesses the required data memory locations (in memory 100) in a specific order that is pre-determined (during the configuration phase) so that precious processor cycles are not spent (during post-configuration operation) to load and store data memory contents due to an apparently constantly changing post-increment.

For example, in FIG. 5, the sequence in which data values X(k) (stored in memory locations having N consecutive addresses) of must be accessed from memory to generate the first N/2 values of a sequence of output values Y(0), Y(1), Y(2), . . . Y(N−1), is: X(0), X(N−1), X(1), X(N−2), . . . , X(N/2−2), X(N−(N/2−1)), X(N/2−1), and X(N−N/2), assuming that N is an even number greater than 6 (FIG. 6 below indicates the appropriate non-consecutive addressing sequence for values of N less than 6). Thus, the N data values X(k) are accessed from memory locations having a predetermined sequence of non-consecutive addresses (determined by the above-indicated sequence of data values). The same non-consecutive addressing is required for output writes of the output data values Y(k) into a "Y array" of memory locations having N consecutive addresses (so that the "i"th stored value Y(k) is stored in the "i"th one of these memory locations).

FIG. 6 indicates the sequence in which the first eight values X(k) of FIG. 5 (or all the values X(k) of FIG. 5 in the case that N=8) are accessed (e.g., by an appropriately pre-configured sequencing unit 116 of FIG. 3) in accordance with a butterfly addressing mode to generate the first four output values Y(0), Y(1), Y(2), and Y(3). The next eight values X(k) are accessed (to generate Y(4), X(5), X(6), and X(7)) in accordance with the butterfly addressing mode in the order opposite that shown in FIG. 6 (e.g., in the order X(4), X(3), X(5), X(2), X(6), X(1), X(7), and finally X(0)).

Preferably, the operation unit of the inventive system is pre-configured to access elements of a data vector X(k), and to write to memory resulting output values Y(k) while operating in at least one butterfly addressing mode (e.g., the addressing mode described with reference to FIG. 5) to achieve significant savings in processing clock cycles and power consumption in accordance with the invention during post-configuration operation of the operation unit. Preferably, a sequencing and data retrieval unit of the operation unit (e.g., unit 116 of FIG. 3) includes configurable address generation circuitry that allows such pre-configuration to be accomplished simply by specifying a vector size (e.g., vector size N in the FIG. 5 example) and a butterfly addressing mode in which the operating unit should operate (to read from memory elements of a vector having the specified size, or write to memory elements of a vector having the specified size). The configurable address generation circuitry of such a sequencing and data retrieval unit (e.g., unit 117 of FIG. 3) preferably includes address offset circuitry operable in each butterfly addressing mode (or other non-consecutive addressing mode in which it can be configured to operate) to assert a predetermined sequence of offset values (unique to that addressing mode) that determines a sequence of translated addresses in response to each base address of a data vector of the specified size (e.g., each data vector having N elements) to be read from or written to memory. For example, the address offset circuitry can include registers that contain, or include logic for generating, a predetermined sequence of offset values for each of a number of different vector sizes in each different addressing mode. During post-configuration operation of the operating unit, the elements of each predetermined sequence of offset values can be added sequentially to the base address of a data vector to generate a sequence of translated addresses for the elements of the data vector. These translated addresses can then be asserted to a DMA engine (e.g., engine 118 of FIG. 3) to cause the DMA engine to read elements of the vector from (or write elements of the vector to) the memory locations determined by the translated addresses. Configuration bits from the system's configuration unit (e.g., unit 114 of FIG. 3) are asserted to the address offset circuitry (e.g., to unit 117 of FIG. 3) during a configuration phase to determine the particular predetermined sequence of offset values to be asserted by the address offset circuitry during post-configuration operation (by specifying a specific addressing mode and vector size).

Preferably, the inventive operation unit is also pre-configurable to operate in a second butterfly addressing mode (to address elements of a vector X(k), where k=0, ..., N-1, and where each element has a real part Re(X(k)) and an imaginary part Im(X(k)) stored in memory locations having consecutive addresses). The vector's size is specified by a configuration unit during the configuration process. When operating in the second butterfly addressing mode, the pre-configured operating unit executes memory accesses to access first all the real parts of the vector's elements (in consecutive order) and then to access all the imaginary parts of the vector's elements (also in consecutive order), as in the example shown in FIG. 7. This butterfly addressing mode is useful for de-interleaving a complex input vector into real and imaginary vectors.

Many operations that the inventive operation unit may be configured to perform (including IFFT and FFT operations) either receive inputs in normal order and produce outputs in bit-reversed order or receive inputs in bit-reversed order and produce outputs in normal order. Some conventional digital signal processors (DSPs) support bit-reversed address generation by allowing post-modification of data addresses to be bit-reversed based on the specified size of the array. However, in order to perform such bit-reversed address generation, these conventional DSPs need extra overhead for separating the real and imaginary parts of complex inputs and outputs or even- and odd-numbered elements.

With reference to FIG. 8, we next describe a bit-reversed addressing mode (for addressing elements of vector X(k), where k=0, ..., N-1, and each element typically has a real part and an imaginary part) in which the inventive operation unit can be pre-configured to operate. FIG. 8 is a diagram showing the order in which real and imaginary parts of such a vector X(k), having size N=8, are accessed in an example of this bit-reverse addressing mode. In the FIG. 8 example, the real and imaginary parts of the elements of vector X(k) are accessed in the order: Re(X(0)), Im(X(0)), Re(X(4)), Im(X(4)), Re(X(2)), Im(X(2)), Re(X(6)), Im(X(6)), Re(X(1)), Im(X(1)), Re(X(5)), Im(X(5)), Re(X(3)), Im(X(3)), Re(X(7)), and Im(X(7)). An operation unit pre-configured to operate in the inventive bit-reversed addressing mode can perform bit-reversed address generation on complex inputs (or more generally, on pairs of inputs) in a manner that saves precious processor cycles via direct memory access (DMA).

With reference to FIG. 9, we next describe a second bit-reversed addressing mode (for addressing elements of vector X(k), where k=0, ..., N-1, and each element typically has a real part and an imaginary part) in which the inventive operation unit can be pre-configured to operate. In this second bit-reversed addressing mode, the pre-configured operation unit typically accesses all real parts of a complex input array first (but not consecutively in normal, non-reversed order), followed by all imaginary parts. FIG. 9 is a diagram showing the order in which real and imaginary parts of such a vector X(k), having size N=8, are accessed in an example of this bit-reversed addressing mode. In the FIG. 9 example, the real and imaginary parts of the elements of vector X(k) are accessed in the order: Re(X(0)), Re(X(4)), Re(X(2)), Re(X(6)), Re(X(1)), Re(X(5)), Re(X(3)), Re(X(7)), Im(X(0), Im(X(4), Im(X(2), Im(X(6), Im(X(1), Im(X(5), Im(X(3), and Im(X(7). Operation in such a mode may be useful, for example, when the calculation of an IFFT demands bit-reversed access of input elements but requires that outputs be separated in real and imaginary parts (so that the real parts are written to memory first and then the imaginary parts are written to memory).

In typical embodiments, the operation unit of the inventive system (e.g., unit 116 of FIG. 3) includes a sequencing and data retrieval unit (e.g., unit 116 of FIG. 3) including configurable address generation circuitry (e.g. unit 117 of FIG. 3) to which configuration bits can be asserted (during a configuration phase) to configure the operation unit to implement any such bit-reversed addressing mode during post-configuration operation. Preferably, such configurable address generation circuitry can be configured for operation in any such bit-reversed addressing mode in the same way (described above) that it can be configured for operation in any of the butterfly addressing modes described herein, i.e., simply by asserting configuration bits to the configurable address generation circuitry that specify the addressing mode and size of each vector whose elements are to be read from or written to memory during post-configuration operation in the addressing mode. For example, such configuration bits can cause address offset circuitry in the address generation circuitry to assert a predetermined sequence of offset values, unique to the addressing mode, which determines a sequence of translated addresses in response to each base address of a data vector of the specified size to be read from or written to memory during post-configuration operation.

Preferably, the inventive system includes an operation unit and a configuration unit configured to pre-configure the operation unit in any of two or more addressing modes (and preferably in any of the addressing modes described herein). Such a system (e.g., comprising configuration unit 14 and operation unit 12 of FIG. 1, or configuration unit 114 and operation unit 112 of FIG. 3) only needs configuration instructions (e.g., instructions asserted by main processor 20 of FIG. 1 or FIG. 3) which determine the configuration commands to be asserted from the configuration unit to the operation unit during pre-configuration. Once the operation unit has been so pre-configured, the operation unit (sometimes referred to herein as a hardware accelerator) is able to perform a predetermined operation (e.g., a frequency-to-time domain conversion) independently without any intervention from the main processor or configuration unit. If the operation unit is pre-configured to operate in such an addressing mode and preferably also to perform efficient matrix multiplication (e.g., efficient 2×2 matrix multiplication as described above) in accordance with the invention during performance of a predetermined operation, it can the operation (e.g., a frequency-to-time conversion) with in fewer processing clock cycles and with reduced power consumption and memory storage requirements. This is especially important if the operation is frequency-to-time conversion of audio data because a typical conventional digital signal processor (DSP) or a general-purpose processor consumes between 30-50% of its total consumed audio processing power to perform frequency-to-time conversion of audio data.

In the context of the architecture of the FIG. 3 system, we next explain how to configure the inventive system (and to operate the configured system) to implement an MPEG2-AAC synthesis filter bank efficiently.

Consistent with the explanation above, the pre-modulation phase of an inverse MDCT can be simple multiplication of two complex vectors:

$$Y(k) = (x(2k) + j \cdot x(1023 - 2k)) \cdot e^{\frac{j2\pi(2k+1)}{8N}}$$

for $k=0,1,\ldots,511, N=1024$.

Note that, x(k) is a real sequence and Y(k) is a complex sequence.

Therefore, $$\begin{bmatrix} \text{Re}(Y(k)) \\ \text{Im}(Y(k)) \end{bmatrix} = \begin{bmatrix} \cos(2\pi(2k+1)/8N) & -\sin(2\pi(2k+1)/8N) \\ \sin(2\pi(2k+1)/8N) & \cos(2\pi(2k+1)/8N) \end{bmatrix} \cdot \begin{bmatrix} x(2k) \\ x(1023-2k) \end{bmatrix}$$

In one embodiment, the following steps are performed to configure operation unit 112 of FIG. 3 to perform such a pre-modulation operation:

first, configuration unit 114 asserts addresses in register 129 (which have been received from processor 20) to DMA unit 118 to cause unit 118 to retrieve a configuration list (a sequence of configuration commands and configuration data) from memory 100 and assert the configuration list to registers 130 of unit 114;

then, in response to the configuration list, command parser 132 of unit 114 asserts configuration commands and data to unit 112 to configure the unit 112. The configuration commands and data:

initialize input and output buffers 138, 139, 141, and 142, including by initializing the base pointer of input buffer 138 to point to x(1023) and the pointer of output buffers 141 and 142 to point to Y(0), and causing the pointer of state (coefficient) buffer 139 to point to an array of memory locations in memory 100 that contains the values cos(2π(2k+1)/8N and sin(2π(2k+1)/8N, for k=0, 1 . . . , 511;

cause unit 116 to store the complex output vector in memory 100 such that Y(2n)=Re(Y(n)), and Y(2n+1)=Im(Y(n));

specify the addressing mode to be employed by sequencing unit 116 during post-configuration operation (e.g., to read input data elements from memory 100 and assert the data to buffer 138). Preferably, the addressing mode is the butterfly addressing mode indicated by FIG. 10 (which consists of FIGS. 10(a) and 10(b)). FIG. 10(b) indicates the sequence in which elements of a 1024-element input data vector X(k), stored in memory 100 in memory locations having the order indicated in FIG. 10(a), are read from memory 100 and written into input buffer 138 (which is a FIFO buffer) in this butterfly addressing mode. Specifically, FIG. 10(b) shows that the input data elements are written into input buffer 138 in the order: x(0), x(1023), x(2), x(1021), . . . , x(1020), x(3), x(1022), and finally x(1); and specify that the addressing mode for reading the coefficients from memory 100 is a linear addressing mode, and the addressing mode for writing output data values from output buffer 141 to memory 100 is a linear addressing mode. Since the operation that will follow the pre-modulation operation is an inverse FFT, which needs bit-reversed addressing of the input array, the configuration commands and data alternatively configure unit 112 to write output data values (generated during pre-modulation) from the relevant output buffer to memory 100 in bit-reversed fashion;

specify the format of the output values (by appropriately configuring format conversion unit 148). Specifically, unit 148 is configured to implement 32-bit precision arithmetic. Assuming 31-bit coefficients and 32-bit data, the output values asserted from arithmetic unit 136 to unit 148 will have 64-bit width. Format conversion unit 148 is configured to saturate and shift each 64-bit output value so as to generate a 32-bit output value and asserts each such 32-bit output value to buffer 141. In this case, a right shift by 31 bits followed by 32-bit saturation is typically suitable; and configure unit 112 to perform 2×2 matrix multiplications (as described above) on values clocked out of buffer 138 (and formatted by unit 148) using matrix coefficient magnitudes clocked out of buffer 139 (and formatted by unit 148) to calculate the complex outputs Y(k). Preferably, in response to each pair of magnitudes (indicative of magnitudes of all four coefficients of each 2×2 matrix) clocked out of buffer 139 (and formatted by unit 148), arithmetic unit 136 selectively inverts appropriate ones of these magnitudes and uses appropriate ones of the magnitudes and the inverted versions thereof to perform each 2×2 matrix multiplication.

When unit 112 has been configured, the operation phase can commence. In the operation phase, pre-configured arithmetic unit 136 performs the required calculations for the pre-specified input and output vector size(s). In the described example, the input vector consists of 1024 elements and the output vector also consists of 1024 elements. When the operation is finished, unit 112 can generate an interrupt for the host processor 20 and set a status bit "done". When the host processor reads the status bit, it is cleared and unit 112 is ready to accept new configuration commands and data.

Consistent with the explanation above, the inverse FFT phase of an inverse MDCT computes the following values:

$$y(n) = \sum_{k=0}^{N-1} Y(k) \cdot e^{\frac{j2\pi nk}{N}} \text{ for } n = 0, 1\ldots, 511,$$

where Y(k) and y(n) are sequences of complex values, and Y(k) is the output of the above-described pre-modulation phase.

The inverse-FFT algorithm (and also the FFT algorithm) can be decomposed into multiple stages, each stage comprising complex butterfly operations. For a 512-point complex IFFT, there are a total of $\log_2 (512)=9$ stages. The first stage is shown in FIG. 11, which is a signal flow graph. In each of FIGS. 11, 12, and 13, each bold dot denotes an addition operation and a negative sign between two nodes denotes the operation of changing the sign of the value at the left (input) node before performing the operation (or generating the value) indicated by the right node. In FIG. 11, each of the inputs is a complex value and the inputs are supplied in bit-reversed order.

The computation specified by FIG. 11 is a sequence of the following pairs of operations: an addition of two operands (Y(i)+Y(j)) followed by subtraction of the same two operands (Y(i)−Y(j)). Thus, in preferred embodiments, the operation unit of the inventive system (e.g., unit 112 of FIG. 3) is pre-configured to perform such pair of operations on each two operands clocked into circuitry thereof for performing such arithmetic operations (e.g., each pair of operands clocked into arithmetic unit 136 of FIG. 3 from buffers 138 and 139 via format conversion unit 148), and to output the resulting pair of output values sequentially (e.g., in successive clock cycles) in response to each pair of input operands. This operating mode of the inventive operation unit will sometimes be referred to herein as an "alternating addition/subtraction" mode.

In one embodiment, the following steps are performed to configure operation unit 112 of FIG. 3 to perform the first stage (indicated by FIG. 11) of an IFFT operation:

first, configuration unit 114 asserts addresses in register 129 (which have been received from processor 20) to DMA unit 118 to cause unit 118 to retrieve a configuration list (a sequence of configuration commands and configuration data) from memory 100 and assert the configuration list to registers 130 of unit 114. The following description assumes that real and imaginary parts of each complex input value Y(k) are stored in consecutive storage locations in memory 100: Re(Y(0)), then Im(Y(0)), Re(Y(1)), Im(Y(1)), ..., Re(Y(511)), and finally Im(Y(511));

in response to the configuration list in registers 130, command parser 132 of unit 114 asserts configuration commands and data to unit 112 to configure the unit 112. The configuration commands and data:

set up the input and output buffers 138, 139, 141, and 142. There are two inputs (real and imaginary parts of a complex value) and two outputs for each of the alternating additions and subtractions (butterfly operations) indicated in FIG. 11;

initialize the base pointer of input buffer 138 to point to Re(Y(0)) and the base pointer of input buffer 139 to point to Re(Y(1)), and initialize the base pointer of output buffer 141 to point to Re(Y1(0)), and the base pointer of output buffer 142 to point to Re(Y1(1));

specify that the addressing mode for reading input values from memory 100 (and writing them into buffer 138 or 139) is a bit-reversed addressing mode, and the addressing mode for writing output data values from output buffer 141 (or 142) to memory 100 is a linear addressing mode. The bit-reversed addressing when reading input array automatically translates input reads addressed to Re(Y(1)) to fetch Re(Y(256)), input reads addressed to Re(Y(2)) to fetch Re(Y(128)), and so on. If the outputs of the pre-modulation are already stored in memory 100 in bit-reversed order (which is mentioned above as a possibility), then the addressing mode for reading input values from memory 100 (and writing them into buffer 138 or 139) should be a normal linear addressing mode;

specify that unit 112 should operate in the "alternating addition/subtraction" mode (defined above) to perform successive additions and subtractions on each pair of values (real or imaginary parts of input values Y(k)) clocked out of buffers 138 and 139 and formatted by unit 148, to calculate consecutive pairs of sums and differences of real or imaginary parts of consecutive values (Y(k) and Y(k+1)) of the complex input values Y(k) indicated in FIG. 11 (i.e., the configuration commands and data should specify that unit 136 operate in the alternating addition/subtraction mode to output Re(Y1(k)) and Re(Y1(k+1)), or Im(Y1(k)) and Im(Y1(k+1)) of FIG. 11, in successive clock cycles in response to formatted versions of the relevant pair of inputs Re(Y(i)) and Re(Y(j)), or Im(Y(i)) and Im(Y(j)), of FIG. 11 that are simultaneously clocked into unit 136); and specify that format conversion unit 148 should saturate each result at the 32-bit boundary.

After unit 112 has been so configured, it can perform stage 1 of the IFFT in a manner that is data driven and autonomous. It completes all the alternating addition/subtraction (butterfly) computations and produces the Y1 array, and halts when all the elements of the Y1 have been generated and written to memory 100. Through all the computations of stage 1 of the IFFT, the bit-reversals of input addresses occur on-the-fly due to unit 112's operation in the bit-reversed addressing mode. When unit 112 has completed stage 1, it either produces an interrupt or sets a status bit to indicate to host processor 20 that the host processor can now configure 112 to perform another operation.

Stage 2 of the 512-point IFFT phase (of the exemplary inverse MDCT) is depicted in FIG. 12. In this stage, the addressing of both input and output values is preferably normal (linear) addressing, and the computations consist of initial twiddle-factor multiplications (of some of the input values) and consecutive addition and subtraction operations (butterfly operations) on pairs of data values. Each twiddle factor multiplication is a simple operation in this case because it is multiplication by a twiddle factor=−j, which is equivalent to simply switching of real and imaginary parts (of each complex input value Y1(k) to undergo twiddle factor multiplication) and inverting the sign of the imaginary part. Thus, the first set of four complex outputs is determined by the following equations:

$$Re(Y2(0))=Re(Y1(0))+Re(Y1(2))$$

$$Im(Y2(0))=Im(Y1(0))+Im(Y1(2))$$

$$Re(Y2(1))=Re(Y1(1))+Im(Y1(3))$$

$$Im(Y2(1))=Im(Y1(1))-Re(Y1(3))$$

$$Re(Y2(2))=Re(Y1(0))-Re(Y1(2))$$

$$Im(Y2(2))=Im(Y1(0))-Im(Y1(0))$$

$$Re(Y2(3))=Re(Y1(1))+Im(Y1(3))$$

$$Im(Y2(3))=Im(Y1(1))+Re(Y1(3))$$

Therefore stage 2 can be performed using only addition and subtraction operations (and sign inversions), and no explicit twiddle-factor multiplication is needed.

In one embodiment, the following steps are performed to configure operation unit 112 of FIG. 3 to perform the second stage (indicated by FIG. 12) of an IFFT operation:

first, configuration unit 114 asserts addresses in register 129 (which have been received from processor 20) to DMA unit 118 to cause unit 118 to retrieve a configuration list (a sequence of configuration commands and configuration data) from memory 100 and assert the configuration list to registers 130 of unit 114; and in response to the configuration list in registers 130, command parser 132 of unit 114 asserts configuration commands and data to unit 112 to configure the unit 112. The configuration commands and data:

set up the input and output buffers 138, 139, 141, and 142. There are two inputs and two outputs for each of the alternating additions and subtractions;

initialize the base pointer of input buffer 138 to point to Re(Y1(0)) and the base pointer of input buffer 139 to point to Re(Y1(2)), and initialize the base pointer of output buffer 141 to point to Re(Y1(0)) and the base pointer of output buffer 142 to point to Re(Y2(2)).

specify that the addressing mode for reading input values from memory 100 (and writing them into buffer 138 or 139) is a normal (linear) addressing mode, and the addressing mode for writing output data values from output buffer 141 (or 142) to memory 100 is also a normal (linear) addressing mode;

configure unit 112 to operate in the "alternating addition/subtraction" mode (defined above) to perform successive additions and subtractions on each pair of values (real or imaginary parts of input values Y1(i) and Y1(0)) clocked out of buffers 138 and 139 simultaneously and formatted by unit 148, to calculate consecutive pairs of sums and differences of real or imaginary parts of the input values as indicated in FIG. 12, and thereby to calculate a first subset of the complex outputs Y2(k) indicated in FIG. 12; and specify that format conversion unit 148 should saturate each result at the 32-bit boundary.

After unit 112 has been so configured, it can perform a first portion of stage 2 of the IFFT in a manner that is data driven and autonomous. It completes all the alternating addition and subtraction (butterfly) computations, produces the first subset of the Y2 array, and halts when all the elements of this subset of the Y2 array have been generated and written to memory 100.

The above-described steps are then repeated three times (each time with a different initialization of pointers of buffers 138, 139, 141, and 142) to generate second, third, and fourth subsets of the Y2 array, respectively, such that the first, second, third, and fourth subsets of the Y2 array determine the entire Y2 array. During the first repetition, the base pointer of input buffer 138 is initialized to point to Im(Y1(0)) and the base pointer of input buffer 139 is initialized to point to Im(Y1(2)), the base pointer of output buffer 141 is initialized to point to Im(Y2(0)) and the base pointer of output buffer 142 is initialized to point to Im(Y2(2)). During the second repetition, the base pointer of input buffer 138 is initialized to point to Re(Y1(1)) and the base pointer of input buffer 139 is initialized to point to Im(Y1(3)), the base pointer of output buffer 141 is initialized to point to Re(Y2(1)) and the base pointer of output buffer 142 is initialized to point to Re(Y2(3)). During the third repetition, the base pointer of input buffer 138 is initialized to point to Im(Y1(1)) and the base pointer of input buffer 139 is initialized to point to Re(Y1(3)), the base pointer of output buffer 141 is initialized to point to Im(Y2(3)) and the base pointer of output buffer 142 is initialized to point to Im(Y2(1)).

When unit 112 has completed the fourth (final) portion of stage 2, it either produces an interrupt or sets a status bit to indicate to host processor 20 that the host processor can now configure 112 to perform another operation (e.g., stage 3 of the 512-point IFFT phase of the exemplary inverse MDCT).

Stage 3 of the 512-point IFFT phase (of the exemplary inverse MDCT) is depicted in FIG. 13. The steps of stage 3 are similar to those of above-described stage 2, except that the twiddle factor multiplication is not a simple operation in this case. In stage 3, the twiddle factors have form $$W_N^k = e^{\frac{-j2\pi k}{N}}.$$

In one embodiment, the following steps are performed to configure operation unit 112 of FIG. 3 to perform the third stage (indicated by FIG. 13) of an IFFT operation:

first, configuration unit 114 asserts addresses in register 129 (which have been received from processor 20) to DMA unit 118 to cause unit 118 to retrieve a configuration list (a sequence of configuration commands and configuration data) from memory 100 and assert the configuration list to registers 130 of unit 114; and in response to the configuration list in registers 130, command parser 132 of unit 114 asserts configuration commands and data to unit 112 to configure the unit 112. The configuration commands and data:

configure unit 112 to perform 2×2 matrix multiplications on pairs of values clocked out of buffer 138 (and formatted by unit 148) using matrix coefficient magnitudes (which determine the relevant twiddle factors) clocked out of buffer 139 (and formatted by unit 148) to calculate complex outputs that will subsequently undergo addition or subtraction as indicated in FIG. 13. Preferably, in response to each pair of matrix coefficient magnitudes (indicative of magnitudes of all four coefficients of each 2×2 matrix) clocked out of buffer 139 (and formatted by unit 148), arithmetic unit 136 selectively inverts appropriate ones of these magnitudes and uses appropriate ones of the magnitudes and the inverted versions thereof to perform each 2×2 matrix multiplication. The signs of the matrix coefficient are programmed based on the format in which the matrix coefficient magnitudes are stored in memory 100;

set up the input and output buffers 138, 139, 141, and 142, including by initializing the base pointer of input buffer 138 to point to Re(Y2(5)) and the base pointer of input buffer 139 to point to the relevant matrix coefficient magnitude (since the first arithmetic task is a 2×2 matrix multiplication) and initializing the base pointer of output buffer 141 to point to Re(Y2(5)) (to cause the result of the matrix multiplication to be replace the original, pre-multiplication value Re(Y2(5)));

specify that the addressing mode for reading input values and matrix coefficient magnitudes from memory 100 (and writing them into buffer 138 or 139) is a normal (linear) addressing mode, and the addressing mode for writing output data values from output buffer 141 (or 142) to memory 100 is also a normal (linear) addressing mode. However in order to address input values in the following sequence during the matrix multiplications: Re(Y2(5)), Im(Y2(5)), Re(Y2(6)), Im(Y2(6)), Re(Y2(7)), Im(Y2(7)), Re(Y2(13)), Im(Y2(13)), Re(Y2(14)), Im(Y2(14)), Re(Y2(15)), Im(Y2(15)), ... and so on, the matrix stride employed in sequencing unit 116 to access the input values needed to implement the matrix multiplications is programmed to 16 (the distance between Re(Y2(5)) and Re(Y2(13)));

configure unit 112 to operate (after the matrix multiplications) in the "alternating addition/subtraction" mode (defined above) in which unit 136 performs successive additions and subtractions on each pair of values (real or imaginary parts of input values Y2(i) and Y2(j) or values generated by the described matrix multiplications) clocked out of buffers 138 and 139 simultaneously (and then formatted by unit 148) to calculate consecutive pairs of sums and differences of real or imaginary parts of the operand values as indicated in FIG. 13, and thereby to calculate the complex outputs Y3(k) indicated in FIG. 13;

set up the input and output buffers 138, 139, 141, and 142 so that (after the matrix multiplications) the base pointer of input buffer 138 is initialized to point to Re(Y2(0)) and the base pointer of input buffer 139 is initialized to point to Re(Y2(4)), the base pointer of output buffer 141 is initialized to point to Re(Y3(0)), and the base pointer of output buffer 142 is initialized to point to Re(Y3(4)). There are two inputs and two outputs for each of the additions and subtractions indicated in FIG. 13; and specify that the addressing mode for reading input values and matrix coefficient magnitudes from memory 100 (and writing them into buffer 138 or 139) is a normal (linear) addressing mode during the additions and subtractions, and the addressing mode for writing output data values from output buffer 141 (or 142) to memory 100 is also a normal (linear) addressing mode during the additions and subtractions. However in order to address the following sequence of first input values to be written into buffer 138: Re(Y2(0)), Re(Y2(1)), Re(Y2(2)), Re(Y2(3)), Re(Y2(8)), Re(Y2(9)), Re(Y2(10)), Im(Y2(11)), ... and so on, the matrix stride employed in sequencing unit 116 is programmed to 16 (the distance between Re(Y2(0)) and Re(Y2(8))). Similarly the matrix stride employed in sequencing unit 116 to address the sequence of second input values to be written into buffer 139 is programmed to be 16, and the matrix stride employed in sequencing unit 116 to address the sequence of output values to be written to memory 100 from buffer 1141 (or 142) is programmed to be 16.

After unit 112 has been so configured, it can perform stage 3 of the IFFT in a manner that is data driven and autonomous. It completes all the alternating addition and subtraction (but-terfly) computations to produce the Y3 array, and halts when all the elements of the Y3 array have been generated and written to memory 100. When unit 112 has completed stage 3, it either produces an interrupt or sets a status bit to indicate to host processor 20 that the host processor can now configure 112 to perform another operation.

Consistent with the explanation above, the post-modulation phase of an inverse MDCT can be simple multiplication of two complex vectors:

$$y(2n) + j \cdot y(1023 - 2n) = x(k) \cdot e^{\frac{j2\pi k}{N}}$$

for $k=0,1,\ldots,511$, and $N=1024$.

Note that x(k) is a complex sequence and y(n) is real sequence, satisfying:

$$\begin{bmatrix} y(2n) \\ y(1023-2n) \end{bmatrix} = \begin{bmatrix} \cos(2\pi n/2N) & -\sin(2\pi n/2N) \\ \sin(2\pi n/2N) & \cos(2\pi n/2N) \end{bmatrix} \cdot \begin{bmatrix} \text{Re}(x(k)) \\ \text{Im}(x(k)) \end{bmatrix}.$$

In one embodiment, the real and imaginary parts of each element of complex input vector x(k) are stored in memory 100 in consecutive memory locations (so that x(2k)=Re(x(k)), and x(2k+1)=Im(x(k))), and the following steps are performed to configure operation unit 112 of FIG. 3 to perform the post-modulation operation:

first, configuration unit 114 asserts addresses in register 129 (which have been received from processor 20) to DMA unit 118 to cause unit 118 to retrieve a configuration list (a sequence of configuration commands and configuration data) from memory 100 and assert the configuration list to registers 130 of unit 114;

then, in response to the configuration list, command parser 132 of unit 114 asserts configuration commands and data to unit 112 to configure the unit 112. The configuration commands and data:

initialize input and output buffers 138, 139, 141, and 142, including by initializing the base pointer of input buffer 138 to point to Re(x(0)) and the pointer of output buffer 141 to point to y(0), and causing the pointer of state (coefficient) buffer 139 to point to an array of memory locations in memory 100 that contains the coefficient magnitudes cos (2πn/2N) and sin(2πn/2N), for n=0, 1 ..., 511 and N=1024;

specify that the addressing mode to be employed by sequencing unit 116 during post-configuration operation for reading input data elements and coefficient magnitudes from memory 100 is a linear addressing mode, and the addressing mode for writing output data values from output buffer 141 to memory 100 is the butterfly addressing mode indicated by FIG. 10 (which allows writing of output data values in the sequence y(0), y(1023), y(2), y(1021), ..., and so on). This butterfly addressing mode allows sequencing unit 116 to address the output vector in the correct sequence without spending any processor cycles for reordering;

specify the format of the output values (by appropriately configuring format conversion unit 148). Specifically, format conversion unit 148 is configured to saturate and shift each output value so as to generate a 32-bit output value and assert each such 32-bit output value to buffer 141;

configure unit 112 to perform 2×2 matrix multiplications (as described above) on values clocked out of buffer 138 (and formatted by unit 148) using matrix coefficient magnitudes clocked out of buffer 139 (and formatted by unit 148) to calculate the output values y(k). Preferably, in response to each pair of magnitudes (indicative of magnitudes of all four coefficients of each 2×2 matrix) clocked out of buffer 139 (and formatted by unit 148), arithmetic unit 136 selectively inverts appropriate ones of these magnitudes and uses appropriate ones of the magnitudes and the inverted versions thereof to perform each 2×2 matrix multiplication.

When unit 112 has been configured, the operation phase can commence. In the operation phase, pre-configured arithmetic unit 136 performs the required calculations for the pre-specified input and output vector size(s). In the described example, the input vector consists of 1024 elements and the output vector also consists of 1024 elements. When the operation is finished, unit 112 can generate an interrupt for the host processor 20 and set a status bit "done". When the host processor reads the status bit, it is cleared and unit 112 is ready to accept new configuration commands and data.

It should be understood that while some embodiments of the present invention are illustrated and described herein, the invention is defined by the claims and is not to be limited to the specific embodiments described and shown.

What is claimed is:

1. A system comprising:
an operation unit comprising circuitry configurable to perform a number of operations on audio data, the number of operations comprising a first matrix multiplication of a first vector and a first matrix during a pre-modulation phase, a second matrix multiplication of a second vector and a second matrix during an inverse Fast Fourier Transform, and a third matrix multiplication of a third vector and a third matrix during a post-modulation phase, each of the first, second, and third matrixes comprises coefficients that exhibit symmetry, the operation unit comprising an arithmetic unit coupled to a format conversion unit, the operation unit configurable to write data resulting from the pre-modulation phase to memory using an addressing scheme comprising a vector stride value and a matrix stride value, the operation unit configurable to read data from the memory using the addressing scheme for the post-modulation phase, the vector stride value comprises an amount by which a previous address of an element of a first data vector is modified to determine an address for a next element of the first data vector, the matrix stride value is used to modify an address of a last element of the first data vector to determine an address for an element of a second data vector; and
a configuration unit coupled and configured to assert configuration information to the operation unit to configure the operation unit to perform the number of operations, wherein the configuration unit is operable to assert configuration bits to the operation unit to configure the operation unit to perform the first, second, and third matrix multiplications, wherein the configuration bits determine signs of the coefficients of each of the first, second, and third matrixes but magnitudes of only a subset of the coefficients of each of the first, second, and third matrixes, the configuration unit is operable to configure the arithmetic unit, the configuration unit comprising a parser coupled to the arithmetic unit and the format conversion unit, the parser operable to assert an addressing mode to the operation unit and to assert a start control bit to the operation unit;
wherein the configuration unit is coupled to receive the configuration information that was translated from a processor protocol into a configuration unit protocol.

2. The system of claim 1, wherein the magnitudes of the subset of the coefficients of each of the first, second, and third matrixes are stored in the memory.

3. The system of claim 1, wherein the magnitudes of the subset of the coefficients of each of the first, second, and third matrixes are stored in the memory and the configuration bits determine addresses of said magnitudes in the memory.

4. The system of claim 3, further comprising the memory, and wherein the operation unit comprises a DMA (direct memory access) engine coupled to the memory and operable to read the magnitudes of the subset of the coefficients of each of the first, second, and third matrixes from locations of the memory having said addresses.

5. The system of claim 1, wherein each of the first, second, and third matrixes consists of four coefficients, the subset of each of the first, second, and third matrixes consists of two of the coefficients, and the configuration bits for each of the first, second, and third matrixes comprise a configuration bit-field that specifies the signs of the four coefficients.

6. The system of claim 1, wherein each of the first, second, and third matrixes consists of four coefficients, each of two of the four coefficients has a first absolute magnitude, each other one of the four coefficients has a second absolute magnitude, and the configuration bits determine the first absolute magnitude, the second absolute magnitude, and signs of all four of the coefficients.

7. The system of claim 1, wherein said circuitry of the operation unit has pipelined architecture.

8. The system of claim 1, wherein each of the first, second, and third matrix multiplications comprises a complex exponential factor comprising a real part and an imaginary part.

9. A data processing system comprising:
an operation unit comprising circuitry configurable to perform a number of operations on data, the number of operations comprising a frequency-domain to time-domain transform on the data that comprises a first matrix multiplication of a first vector and a first matrix during a pre-modulation phase, a second matrix multiplication of a second vector and a second matrix during an inverse Fast Fourier Transform, and a third matrix multiplication of a third vector and a third matrix during a post-modulation phase, each of the first, second, and third matrixes comprises coefficients that exhibit symmetry, the operation unit comprising an arithmetic unit coupled to a format conversion unit, the operation unit configurable to write data resulting from the pre-modulation phase to memory using an addressing scheme comprising a vector stride value and a matrix stride value, the operation unit configurable to read data from the memory using the addressing scheme for the post-modulation phase, the vector stride value comprises an amount by which a previous address of an element of a first data vector is modified to determine an address for a next element of the first data vector, the matrix stride value is used to modify an address of a last element of the first data vector to determine an address for an element of a second data vector; and
a configuration unit coupled and configured to assert configuration information to the operation unit to configure the operation unit to perform the number of operations, wherein the configuration unit is operable to assert configuration bits to the operation unit to configure the operation unit to perform the first, second, and third matrix multiplications, wherein the configuration bits determine signs of the coefficients of each of the first, second, and third matrixes but magnitudes of only a subset of the coefficients of each of the first, second, and third matrixes, the configuration unit is operable to configure the arithmetic unit, the configuration unit comprising a parser coupled to the arithmetic unit and the format conversion unit, the parser operable to assert an addressing mode to the operation unit and to assert a start control bit to the operation unit;

wherein the configuration unit is coupled to receive the configuration information that was translated from a processor protocol into a configuration unit protocol.

10. The system of claim 9, wherein the magnitudes of the subset of the coefficients of each of the first, second, and third matrixes are stored in the memory and the configuration bits determine addresses of said magnitudes in the memory.

11. The system of claim 10, further comprising the memory, and wherein the operation unit comprises a DMA (direct memory access) engine coupled to the memory and operable to read the magnitudes of the subset of the coefficients of each of the first, second, and third matrixes from locations of the memory having said addresses.

12. The system of claim 11, further comprising:
an input buffer coupled to the DMA engine and the format conversion unit; and
an output buffer coupled to the DMA engine and the format conversion unit.

13. The system of claim 9, wherein each of the first, second, and third matrixes consists of four coefficients, each of two of the four coefficients has a first absolute magnitude, each other one of the four coefficients has a second absolute magnitude, and the configuration bits determine the first absolute magnitude, the second absolute magnitude, and signs of all four of the coefficients.

14. The system of claim 9, wherein each of the first, second, and third matrix multiplications comprises a complex exponential factor comprising a real part and an imaginary part.

15. The system of claim 9, wherein said circuitry of the operation unit has pipelined architecture.

16. A method comprising:
defining a multi-step operation to be performed by an operation unit comprising circuitry comprising pipelined architecture, said multi-step operation comprising a first matrix multiplication of a first vector and a first matrix during a pre-modulation phase, a second matrix multiplication of a second vector and a second matrix during an inverse Fast Fourier Transform, and a third matrix multiplication of a third vector and a third matrix during a post-modulation phase, each of the first, second, and third matrixes comprises X coefficients exhibiting symmetry, where X is a number, the operation unit comprising an arithmetic unit coupled to a format conversion unit, the multi-step operation further comprising the operation unit writing data that results from the pre-modulation phase to memory using an addressing scheme comprising a vector stride value and a matrix stride value and the operation unit reading data from the memory using the addressing scheme for the post-modulation phase, the vector stride value comprises an amount by which a previous address of an element of a first data vector is modified to determine an address for a next element of the first data vector, the matrix stride value is used to modify an address of a last element of the first data vector to determine an address for an element of a second data vector;

translating a sequence of configuration commands and configuration data for configuring the operation unit to perform the first, second, and third matrix multiplications, wherein said translating is from a processor protocol into a configuration unit protocol;

asserting via a configuration unit configuration bits to the operation unit, determined by the sequence of configuration commands and configuration data, thereby configuring the operation unit to perform the first, second, and third matrix multiplications, wherein the configuration bits determine signs of X coefficients of each of the first, second, and third matrixes but magnitudes of Y of the coefficients of each of the first, second, and third matrixes, where Y is less than X, the asserting configures the arithmetic unit, the configuration unit comprising a parser coupled to the arithmetic unit and the format conversion unit;

asserting via the parser an addressing mode to the operation unit; and asserting via the parser a start control bit to the operation unit.

17. The method of claim 16, wherein each of the first, second, and third vectors is a 2×1 audio data vector and each of the first, second, and third matrixes is a 2×2 matrix.

18. The method of claim 16, wherein each of the first, second, and third matrix multiplications comprises a complex exponential factor comprising a real part and an imaginary part.

* * * * *